United States Patent [19]

Abe et al.

[11] Patent Number: 5,451,642

[45] Date of Patent: Sep. 19, 1995

[54] THERMOPLASTIC RESIN COMPOSITION AND ARTICLE COMPRISING THE SAME

[75] Inventors: Hiroomi Abe; Takeshi Fujii, both of Chiba; Kiyoshi Mitsui, Ichihara; Hideo Shinonaga; Satoru Sogabe, both of Chiba; Satoru Hosoda, Ichihara; Keitaro Kojima, Chiba, all of Japan

[73] Assignee: Sumitomo Chemical Company, Limited, Osaka, Japan

[21] Appl. No.: 363,587

[22] Filed: Dec. 23, 1994

Related U.S. Application Data

[63] Continuation of Ser. No. 102,340, Aug. 5, 1993, abandoned, which is a continuation of Ser. No. 697,594, May 9, 1991, abandoned.

[30] Foreign Application Priority Data

May 11, 1990 [JP] Japan ................................. 2-121724

[51] Int. Cl.6 .............................................. C08L 77/02
[52] U.S. Cl. .................................... 525/179; 525/184; 525/421; 525/425
[58] Field of Search ................. 525/179, 184, 421, 425

[56] References Cited

U.S. PATENT DOCUMENTS

| | | | |
|---|---|---|---|
| 4,315,086 | 2/1982 | Ueno | 525/931 |
| 4,707,528 | 11/1987 | Koizumi | 525/432 |
| 4,780,505 | 10/1988 | Mashita et al. | |
| 4,929,675 | 5/1990 | Abe | 525/66 |
| 4,957,966 | 9/1990 | Nishio | 525/66 |
| 5,221,712 | 1/1993 | Ohmae | 525/66 |

FOREIGN PATENT DOCUMENTS

| | | |
|---|---|---|
| 0245965 | 11/1987 | European Pat. Off. . |
| 0279578 | 8/1988 | European Pat. Off. . |
| 0258040 | 9/1988 | European Pat. Off. . |
| 2043456 | 2/1987 | Japan ................. 525/66 |

*Primary Examiner*—James J. Seidleck
*Assistant Examiner*—I. Zemel
*Attorney, Agent, or Firm*—Stevens, Davis, Miller & Mosher

[57] ABSTRACT

A thermoplastic resin composition containing a polyamide resin composition (C) consisting of a polyamide resin (A) and another thermoplastic resin (B) and at least one modifier (D) is excellent in coatability, mechanical properties, linear expansion coefficient and appearance, can be molded into an article which comprises the polyamide resin (C), wherein the ratio of the percent occupied area of the polyamide resin on the surface of the article to the weight percentage of the polyamide in the polyamide resin composition (C) is not less than 1.2, and/or the ratio of the percent concentration of the polyamide resin on the surface of the article determined on the basis of the nitrogen concentration on the surface of the article to the weight percentage of the polyamide in the polyamide resin composition (C) is not less than 1,2, which article is suited for electric and electronic parts and automobile parts such as a bumper, fender and wheel cover.

9 Claims, 5 Drawing Sheets

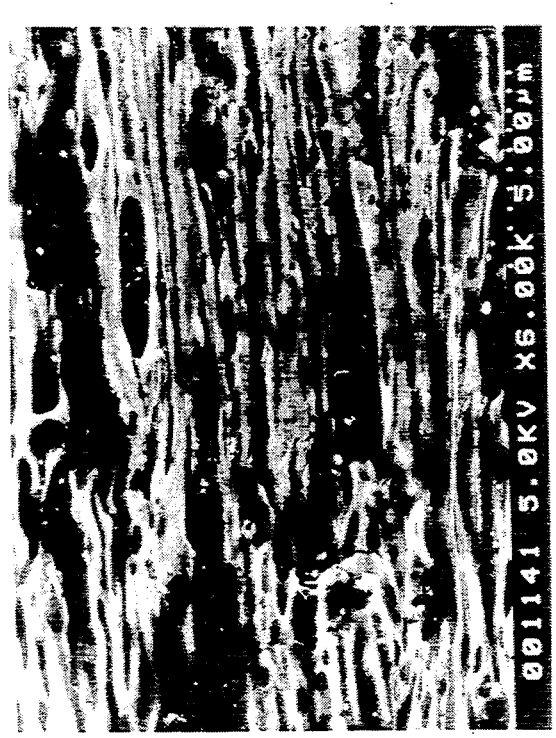
FIG. I(b)
FIG. I(a)

FIG. I(d)
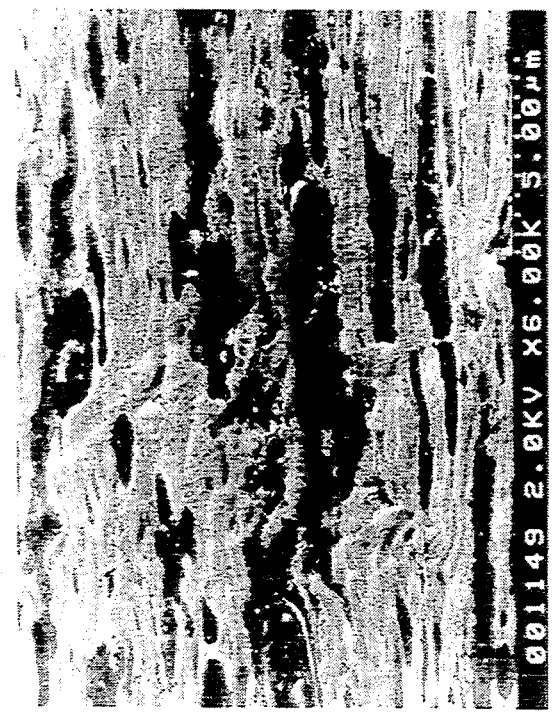
FIG. I(c)

THERMOPLASTIC RESIN COMPOSITION AND ARTICLE COMPRISING THE SAME

This application is a continuation of application Serial No. 08/102,340, filed Aug. 5, 1993; now abandoned, which in turn is a continuation of application Ser. No. 07/697,594, filed May 9, 1991, now abandoned.

The present invention relates to a novel thermoplastic resin composition which can be molded into a molded article by injection molding, extrusion molding, etc. and the molded article itself.

More specifically, the present invention relates to a novel thermoplastic resin composition obtained by incorporating a modifier into a thermoplastic resin composition containing a polyamide resin (hereinafter polyamide resin composition), which thermoplastic resin composition is excellent in coatability, mechanical properties, linear expansion coefficient and appearance; and an article containing said thermoplastic resin composition, which article is suitable for an electronic part, an electric part and an automobile part typified by a fender, a wheel cover, etc.

Polyamide resins have desirable properties such as high heat resistance, stiffness, strength, oil resistance, etc. They are widely used as an engineering resin in the fields of automobile parts, electric and electronic parts, etc. However, they are poor, or remain to be improved, in moldability, impact resistance, water resistance and chemical resistance. They are also disadvantageous in that they have a large specific gravity and need a high manufacturing cost as compared, for example, with polyolefin resins.

JP-A-61-64741 and the other publications disclose that a polypropylene and a polyamide resin, which are inherently incompatible with each other, can be compatibilized and mutually dispersed by incorporating an epoxy-containing copolymer into a mixture of a polyamide resin and a polypropylene resin selected from modified polypropylenes and compositions of a modified polypropylene and polypropylene homopolymer. They teach that the thus obtained thermoplastic resin composition is desirably balanced in moldability, stiffness, heat resistance, impact resistance, scratch resistance, oil resistance, chemical resistance, water resistance, etc., and is excellent in appearance uniformity and smoothness. However, such a composition obtained by blending a polyamide resin with another resin such as a polypropylene resin is often inferior in coatability, adhesion and printability although a polyamide resin itself is excellent in these properties. Thus, the composition taught by the prior art is not always satisfactory, this disadvantage is a hindrance to developing a new practical use of the composition.

In recognition of the situation, one primer layer is usually provided between a resin of low coatability and a layer of a coating in order to improve the compatibility between these two members. However, the manufacturing cost is remarkably increased due to the expensiveness of the primer itself and one extra step for providing the primer layer. Therefore, a further improvement is being desired.

As the surface pretreatment for coating, printing or bonding, various methods such as sandblast treatment, chromic acid mixture treatment, flame treatment, corona discharge treatment, plasma treatment, a method of imparting a surface with a functional group, a surface optical grafting method, etc., have been proposed. However, none of these methods has provided a satisfactory result.

The sandblast treatment is a surface-roughening method which is carried out by allowing particulate abrasives to collide with a material surface. However, the drawback of this treatment is that the particulate abrasives soil working environments and products. It is hence required to wash the material surface with water. There is another problem in that the material surface is opacified due to the sandblast treatment, and abrasives driven into the surface cannot be removed.

The chromic acid mixture treatment is carried out by heating a chromic acid mixture (75 parts of potassium bichromate, 120 parts of water and 1,500 parts of concentrated sulfuric acid) to about 100° C., and immersing a material to be treated in the chromic acid mixture for about 5 minutes. The defect of this treatment is that making its waste liquid harmless costs too much.

The flame treatment is a method of roughening a molded article surface with an oxidative flame (1,000° to 2,500° C.) of a gas containing an excess amount of air. In this method, however, deformation and fusion sometimes take place.

The corona discharge treatment is a surface-roughening method which is carried out by applying a high voltage to a film or filmy material fed through a gap between an electrode and a metal roll. In this method, however, no materials other than a film or filmy material can be treated.

The plasma treatment is a method in which low-temperature plasma is allowed to act on a plastic surface thereby to cause a chemical reaction on the surface with a gas in an ionized state and UV ray, etc. Plasma of oxygen or air is used in the treatment. The disadvantage of this method is that the cost for a treatment apparatus is large.

The method of imparting a surface with a functional group is carried out, e.g. by irradiating a material with UV ray in a chlorine gas, and treating the material with an alkali. The problem of this method is that dangerous chlorine gas is used.

The surface optical grafting method is carried out, e.g. by kneading benzophenone into a polypropylene film and photograftpolymerizing acrylamide under oxygen-free atmosphere. The drawback of this method is that the treatment step is complicated in view of economic benefit.

A composition obtained by blending a polyamide resin with another resin is insufficient in a balance among stiffness, heat resistance and impact resistance. In particular, a composition of which the polyamide resin content is small shows a great decrease in stiffness and heat resistance.

Further, with regard to the appearance uniformity and smoothness, such a composition is not always satisfactory.

Also, for an outer plate of an automobile, for example, it has been strongly desired to develop a low linear expansion material capable of conforming to the elongation and shrinkage of a metal. For this purpose, compositions containing a filler, etc., have been proposed. However, such compositions have defects in that they show a degraded impact strength and are deformed due to the anisotropic mold shrinkage when fibrous fillers are used. Therefore, further improvements are being desired.

Conventional polyamide resin compositions are poor in coatability, and the use of a primer and the surface pretreatment involves various problems as described above. It has been therefore a big technical concern to develop a polyamide resin composition which permits coating, bonding or printing without such a pretreatment step, has an excellent balance among stiffness, heat resistance and impact resistance and an excellent linear expansion coefficient and exhibits an excellent appearance.

It is an object of the present invention to provide a polyamide resin composition having an excellent balance among coatability, physical properties, a linear expansion coefficient and appearance; and a molded article therefrom.

In order to achieve such an object, the present inventors have made a diligent study, and found that a polyamide resin composition can be remarkably improved in coatability, balanced in physical properties, improved in a linear expansion coefficient and appearance by incorporating as a modifier at least one member selected from a carboxylic acid having at least two carboxyl groups in the molecule, the derivatives thereof, an amine having at least two nitrogen atoms in the molecule, urea or the derivatives thereof, and a polyamide of low molecular weight.

Furthermore, the present inventors have also found the following. The polyamide resin concentration at the surface of a molded article of a polyamide resin composition is made higher than the average polyamide resin concentration in the polyamide resin composition by adjusting an S/W ratio to not less than 1.2 in which W is the weight percentage of a polyamide resin in the polyamideresin composition and S is an occupied area ratio (%) of the polyamide resin on the surface of the molded article and/or by adjusting an N/W ratio to not less than 1.2 in which W is an defined above and N is a polyamide resin concentration (%) on a molded article surface, determined on the basis of a nitrogen concentration on the molded article surface, whereby a polyamide resin is remarkably improved in surface properties, coatability in particular. The present invention has been completed based on this finding.

According to the present invention, there are provided a thermoplastic resin composition which comprises:

a polyamide resin composition (C) consisting of to 80% by weight of a polyamide resin (A) and 20 to 90% by weight of another thermoplastic resin (B), and at least one modifier (D) selected from the group consisting of:

a carboxylic acid having at least two carboxyl groups in the molecule, a derivative of a carboxylic acid having at least two carboxylic groups in the molecule.

an amine containing at least two nitrogen atoms in the molecule, urea, a derivative of urea, and a polyamide of low molecular weight, the weight ratio of the modifier (D) to the polyamide resin composition (D) being 0.01:100 to 20:100;

an article which comprises:

a polyamide resin composition (C) consisting of 10 to 80% by weight of a polyamide resin (A) and 20 to 90% by weight of another thermoplastic resin (B), the ratio of percent occupied area of the polyamide resin on a surface of the article to the weight percentage of the polyamide in the polyamide resin composition (C) being not less than 1.2 and/or the ratio of the percent concentration of the polyamide resin on the surface of the article determined on the basis of the nitrogen concentration on the surface of the article to the weight percentage of the polyamide in the polyamide resin composition (C) being not less than 1.2; and an article which comprises:

a polyamide resin composition (C) consisting of 10 to 80% by weight of a polyamide resin (A) and 20 to 90% by weight of another thermoplastic resin (B), and at least one modifier (D) selected from the group consisting of:

a carboxylic acid having at least two carboxyl groups in the molecule, a derivative of a carboxylic acid having at least two carboxyl groups in the molecule, an amine containing at least two nitrogen atoms in the molecule, urea, a derivative of urea, and a polyamide of low molecular weight, the weight ratio of the modifier (D) to the polyamide resin composition (C) being 0.01:100 to 20:100, the ratio of percent occupied area on the surface of the article to the weight percentage of the polyamide in the polyamide resin composition (C) and the modifier (D) being not less than 1.2 and/or the ratio of the percent concentration of the polyamide resin on the surface of the article determined on the basis of the nitrogen concentration on the surface of the article to the weight percentage of the polyamide in the polyamide resin composition (C) and the modifier (D) being not less than 1.2.

BRIEF DESCRIPTION OF THE DRAWINGS

FIGS. 1(a), 1(b), 1(c) and 1(d) are electron micrographs showing the structure of a molded article surface. The electron micrographs show a change in image quality depending upon acceleration voltages, in which the acceleration voltages were 10.0 KV for 1(a), 5.0 KV for 1(b), 2.0 KV for 1(c) and 1.0 KV for 1(d).

DETAILED DESCRIPTION OF THE INVENTION

Figure 2A:
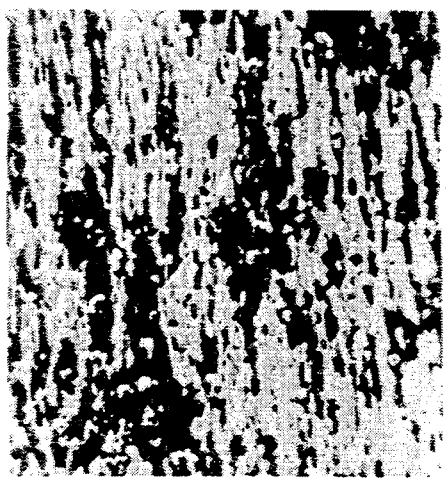
FIGS. 2(a), 2(b), 2(c) and 2(d) are electron micrographs showing the structure of a molded article surface. These micrographs show examples of setting threshold values when a measured object being image-wise analyzed is extracted, in which 2(a) is the original image, 2(b) in the case the threshold value is too low (area ratio of 39.0%), 2(c) in the case the threshold value is proper (area ratio of 58.9%), and 2(d) in the case the threshold value is too high (area ratio of 71.6%).
Figure 2B:
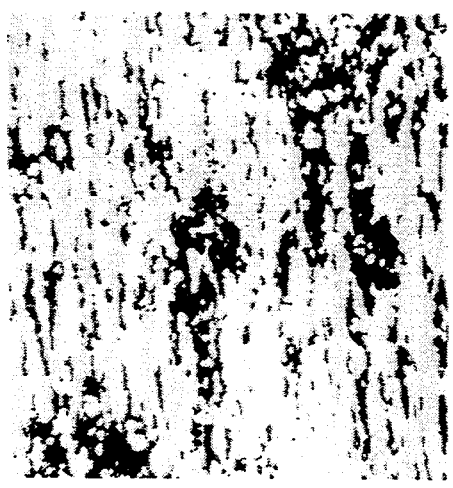
Figure 2C:
Figure 2D:
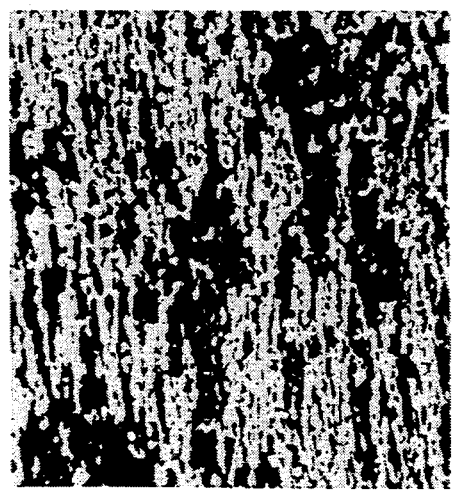

The present invention will be detailed hereinafter.

I Polyamide resin (A)

As a polyamide resin in the present invention, there can be used polyamides obtained from 3- or more-membered ring lactams or a polymerizable ω-amino acids, and polyamides obtained by polycondensation of a dibasic acid with a diamine. Specifically, the polyamide resin is selected from polymers of ε-caprolactam, aminocaproic acid, enantholactam, 7-aminoheptanoic acid, 11-aminoundecanoic acid, etc.; and polymers obtained by polycondensation of diamines such as hexamethylenediamine, nonamethylenediamine, undecamethylenediamine, dodecamethylenediamine, m-xylylenediamine, etc., with dicarboxylic acids such as terephthalic acid, isophthalic acid, adipic acid, sebacic acid, dodecane dibasic acid, glutaric acid, etc. or the copolymers of these acids and amines.

Specific examples of such polyamide resins are aliphatic polyamides such as polyamide 6, polyamide 66, polyamide 610, polyamide 11, polyamide 12 and polyamide 612; aromatic polyamides such as polyhexamethylenediamine terephthalamide, polyhexamethylenediamine isophthalamide and xylene group-containing polyamide; and the like. These polyamide resins can be also used in the form of a mixture or may be a copolymer.

II Thermoplastic resin (B)

As examples of the thermoplastic resin (B), polyolefin resins, polyphenylene resins and saturated polyester resins are described in detail below.

The polyolefin resin used in the present invention includes polyolefins, a variety of modified polyolefins and compositions containing a polyolefin.

In the present invention, the term "polyolefin" refers to a crystalline olefin polymer. Specific examples of the polyolefin are homopolymers of an olefin such as polypropylene, high-density polyethylene, low-density polyethylene, linear low-density polyethylene; copolymers of olefins such as propylene-ethylene copolymers, ethylene-butene-1-copolymers, ethylene-pentene copolymers, ethylene-hexene copolymers and poly-4-methylpentene-1; and copolymers comprising a dominant amount of an olefin and a vinyl monomer polymerizable therewith (e.g. acrylic esters, methacrylic esters, vinyl acetate, styrene, acrylonitrile, glycidyl acrylate, glycidyl methacrylate, etc.). The copolymers may be random, block or graft copolymers. These polyolefins may be used alone or in combination. Of these polyolefins, preferred are polyethylene and polypropylene, and particularly preferred are polypropylene and propylene-ethylene random and block copolymers.

These polyolefins can be produced by a known method, e.g. a method described in "Encyclopedia of Polymer Science and Technology", vol. 6, p. 275 (issued in 1987) and vol. 11, p. 597 (issued in 1969), published by John Wiley & Sons, Inc.

In the present invention, the term "polypropylene" is a crystalline polypropylene. Specific examples thereof include, besides polypropylene homopolymers, block copolymers obtained by polymerizing propylene at a first step and copolymerizing the resultant polypropylene with ethylene and an α-olefin such as propylene, butene-1, etc., at a second step; and a crystalline propylene random copolymer obtained by copolymerizing propylene with not more than 6 mol % of an α-olefin such as ethylene, butene-1, etc.

The homopolymer, block copolymer or random copolymer of propylene can be obtained by reacting the above components in the presence of a combined catalyst comprising a titanium trichloride and an alkylaluminum compound, which is generally called a Ziegler-Natta catalyst.

The polymerization can be carried out at a temperature between 0° C. and 300° C. When α-olefins such as propylene, etc., are polymerized with high stereoregularity, however, the polymerization is generally preferably carried out at a temperature between 0° C. and 100° C. This is because no polymer having high stereoregularity can be obtained at a temperature higher than 100° C., and the like.

The pressure for the polymerization pressure is not critical. From the viewpoints of industrial and economic benefit, however, the pressure is preferably about 3 to 100 atmospheric pressures.

The polymerization may be carried out by either a continuous method or a batch method.

The polymerization method may be a slurry polymerization method using an inert hydrocarbon solvent such as butane, pentane, hexane, heptane, octane, etc.; a solvent polymerization method in which the polymerization is carried out while a polymer formed is dissolved in said inert hydrocarbon solvent; a mass polymerization method in which the polymerization is carried out in liquefied monomers without any solvent; or a gas phase polymerization method in which the polymerization is carried out in gaseous monomers.

A chain transfer agent such as hydrogen, etc., may be added in order to adjust the molecular weight of the polymer.

The polyprepylene used in the present invention can be produced in the presence of an isospecific Ziegler-Natta catalyst. Preferred is a Ziegler-Natta catalyst having high isospecificity.

There is preferred a catalyst of which the transition metal catalyst component is titanium trichloride having a laminar crystal structure or a composite solid compound composed of a magnesium compound and a titanium compound and the typical metal component is an organoaluminum compound. The catalyst may contain a known electron-donating compound as a third component.

The above titanium trichloride can be selected from those produced by reducing titanium tetrachloride with a variety of reducing agents. The reducing agent may be selected from known reducing agents such as metals, e.g. aluminum, titanium, etc., hydrogen, an organometal compound, etc. A typical example of the titanium trichloride produced by reduction with a metal is a titanium trichloride composition containing activated aluminum chloride, ($TiCl_3AA$), produced by reducing titanium tetrachloride with metal aluminum and then pulverizing the resultant reduction mixture in an apparatus such as a ball mill or a vibration mill. In order to improve the isospecificity, polymerization activity and/or particulate properties of the catalyst, the above pulverization may be carried out in the presence of a compound selected from an ether, a ketone, an ester, aluminum chloride, titanium tetrachloride, etc.

Further preferred for the objects of the present invention is titanium trichloride which is obtained by reducing titanium tetrachloride with an organoaluminum compound, and catalytically reacting the resultant titanium trichloride composition with an ether compound and with a halogen compound at the same time or consecutively. The compound preferably has the general formula of $R^1$—O—$R^2$ (in which each of $R^1$ and $R^2$ is an alkyl group having 1 to 18 carbon atoms), and particularly preferred are di-n-butyl ether and di-t-amyl ether. A particularly preferred halogen is iodine, and the halogen compound is preferably iodine trichloride. And, a preferred titanium halide is titanium tetrachloride, and a preferred halogenated hydrocarbon is selected from carbon tetrachloride and 1,2-dichloroethane. The organoaluminum compound has the general formula of $AlR^3{}_nX_{3-n}$ (in which $R^3$ is a hydrocarbon group having 1 to 18 carbon atoms, X is a halogen selected from Cl, Br and I, and n is defined by $3 \geq n > 1$), and it is particularly preferably selected from diethylaluminum chloride and ethylaluminum sesquichloride. The process for the production of the above titanium trichloride is specifically disclosed in JP-A-47-34470, JP-A-53-33289, JP-A-53-51285, JP-A-54-11986, JP-A-58-142903, JP-A-60-28405, JP-A-60-228504, JP-A-61-218606, etc.

When titanium trichloride having a laminar crystalline structure is used as a transition metal compound component, it is preferred to use, as typical metal compound component, an organoaluminum compound having the general formula of $AlR^4{}_mX_{3-m}$ (in which $R^4$ is a hydrocarbon group having 1 to 18 carbon atoms, X is a halogen selected from Cl, Br and I, and m is defined by $3 \geq m > 0$). Particularly preferred for the objects of the present invention is a compound of the above general formula in which $R^4$ is an ethyl or isobutyl group and m is defined by $2.5 \geq m > 1.5$. Specific examples thereof are diethylaluminum chloride, diethylaluminum bromide, diethylaluminum iodide, and mixtures of these with triethylaluminum or ethylaluminum dichloride. When a third compound to be discussed later is used in combination, preferred for the objects of the present invention is also an organoaluminum compound of the above general formula in which m is defined by $3 \geq m > 2.5$ or $1.5 \geq m > 0$.

The molar ratio between the organoaluminum compound and titanium trichloride can be selected from the ratios of from 1:1 to 1,000:1.

The catalyst comprising titanium trichloride and organoaluminum may contain a known third component. Examples of the third component are ester compounds such as ε-caprolactam, methyl methacrylate, ethyl benzoate, methyl toluylate, etc.; phosphite esters such as triphenyl phosphite, tributyl phosphite, etc.; and phosphoric acid derivatives such as hexamethylphosphorictriamide, etc.; and the like.

The amount of the third component is to be experimentally determined for the individual compound, since the activity varies depending upon species of the compounds. In general, this amount is not more than an equimolar amount to that of the organoaluminum.

When a composite solid compound of a magnesium compound and a titanium compound is used as the transition metal solid catalyst component, an organoaluminum compound is preferred as a typical metal catalyst component, and particularly preferred as such is a compound having the general formula of $AlR^5{}_pX_{3-p}$ in which $R^5$ is a hydrocarbon group having 1 to 18 carbon atoms, X is a halogen selected from Cl, Br and I and p is defined by $3 \geq p > 2$. Specific examples thereof are triethylaluminum, triisobutylaluminum and mixtures of these with diethylaluminum chloride or diisobutylaluminum chloride.

The catalyst also preferably contains an electron-donating compound, particularly an aromatic monocarboxylic acid ester and/or a silicon compound containing an $Si-OR^6$ bond.

The silicon compound containing an $Si-OR^6$ bond (in which $R^6$ is a hydrocarbon group having 1 to 20 carbon atoms) is preferably an alkoxysilane compound having the general formula of $R^7{}_aSi(OR^6)_{4-a}$ (in which each of $R^6$ and $R^7$ is a hydrocarbon group having 1 to 20 carbon atoms and a is defined by $0 < a < 3$). Specific examples thereof are tetramethoxysilane, methyltrimethoxysilane, dimethyldimethoxysilane, ethyltrimethoxysilane, phenyltrimethoxysilane, tetraethoxysilane, methyltriethoxysilane, ethyltriethoxysilane, vinyltriethoxysilane, phenyltriethoxysilane, diphenyldimethoxysilane, diphenyldiethoxysilane, butyltriethoxysilane, tetrabutoxysilane, vinyltributoxysilane, diethyldiethoxysilane, etc.

The amount of the above electron-donating compound per mole of the organoaluminum compound is preferably not more than 1 mole, particularly preferably 0.05 to 1 mole.

The composite solid compound of a magnesium compound and a titanium compound is selected from titanium trichloride containing a chloride of magnesium obtained by reducing titanium tetrachloride with an organomagnesium compound, and a so-called "supported catalyst" prepared by catalytically reacting a solid magnesium compound with a liquid-phase titanium compound. The solid magnesium compound preferably contains an electron-donating compound, particularly an aromatic monocarboxylic acid ester, an aromatic dicarboxylic acid diester, an etherified compound, an alcohol and/or a phenolic compound. The aromatic monocarboxylic acid ester may be co-present when the solid magnesium compound is catalytically reacted with the titanium compound.

The above composite solid compound of the magnesium compound and the titanium compound is disclosed in many patent publications, and those suitable for the objects of the present invention are specifically disclosed in JP-A-54-112988, JP-A-54-119586, JP-A-56-30407, JP-A-57-59909, JP-A-57-59910, JP-A-57-59911, JP-A-57-59912, JP-A-57-59914, JP-A-57-59915, JP-A-57-59916, JP-A-54-112982, JP-A-55-133408 and JF-A-58-27704.

When the thermoplastic resin composition of the present invention is used in fields where heat resistance, stiffness, scratch resistance, etc., are required, it is desirable to use a highly crystalline polypropylene in which the homopolymer portion as a first segment polymerized in the first step of homopolymerizing or block-copolymerizing propylene has a boiling heptane-insoluble portion whose isotactic pentad is 0.970 or more, a boiling heptane-soluble portion whose content is not more than 5% by weight and a 20° C. xylene-soluble portion whose content is not more than 2.0% by weight.

The above isotactic pented of the boiling heptane-insoluble portion, the content of the boiling heptane-soluble portion and the content of the 20° C. xylene-soluble portion are determined as follows.

5 Grams of a polypropylene was completely dissolved in 500 ml of boiling xylene, the resultant solution was cooled to 20° C., and the solution was allowed to stand for 4 hours. Then, the solution was filtered to separate a 20° C. xylene-insoluble portion. Xylene was evaporated by concentrating the filtrate and solidifying it by drying, and the residue is further dried under reduced pressure at 60° C. to obtain a polymer soluble in xylene at 20° C. The content of the 20° C. xylene-soluble portion is determined by dividing the dry weight of the polymer by the weight of the charged sample, and represented by percentage. The above 20° C. xylene-insoluble portion was dried, and then extracted with boiling n-heptane in a Soxhlet apparatus for 8 hours. The extraction residue is referred to as a boiling heptane-insoluble portion, and the content of the boiling heptane-insoluble portion is determined by subtracting the dry weight of the boiling heptane-insoluble portion from the weight (5 g) of the charged sample and dividing the remainder by the weight of the charged sample, and represented by percentage.

The isotactic pentad refers to a fraction of a propylene monomer unit present in the central position of an isotactic chain of a polypropylene molecule chain in a pentad unit or a chain formed of meso-bonded five successive propylene monomer units, determined by a method disclosed by A. Zambelli et al., in Macromolecules 6, 925 (1973), i.e. a method using $^{13}$C-NMR. NMR absorption peaks are assigned on the basis of the subsequently issued Macromolecules 8, 687 (1975).

Specifically, the isotactic pentad is determined on the basis of a relative ratio of the area of mmmm peaks to the total area of the absorption peaks assigned to methyl carbons. According to this method, the NPL standard substance CRM No. M19-14 Polypropylene PP/MWD/2 provided by the National Physical Laboratory in United Kingdom was measured for an isotactic pentad to show 0.944.

The above highly crystalline polypropylene can be prepared by any of the methods disclosed in JP-A-60-28405, JP-A-60-228504, JP-A-61-218606, JP-A-61-287917, etc.

When the thermoplastic resin composition of the present invention is used in fields where impact resistance is required, it is preferred to use a polypropylene containing a propylene homopolymer portion as a first segment polymerized in the first step and a propylene block copolymer as a second segment produced in the second step by copolymerization of ethylene and an α-olefin such as propylene, butene-1, etc.

The propylene block copolymer can be prepared by a slurry polymerization or gas phase polymerization method. In particular, when the thermoplastic resin composition is used in a field where high impact resistance is required, it is required to increase the amount of the second segment, and the propylene block copolymer can be suitably prepared by a gas phase polymerization method.

Such a polypropylene having high impact resistance can be prepared by a gas phase polymerization method disclosed, e.g. in JP-A-61-287917.

In the propylene block copolymer, the propylene homopolymer portion polymerized in the first step may be any of a propylene homopolymer and a copolymer of propylene with ethylene or an α-olefin having 4 to 6 carbon atoms wherein the content of the ethylene or α-olefin units is not more than 6 mole %. The copolymer portion as the second segment polymerized in the second step is preferably a homopolymer of ethylene or a copolymer of ethylene with propylene and optionally an α-olefin having 4 to 6 carbon atoms wherein the ethylene content is not less than 10 mole %. The amount of the polymer formed in the second step is 10 to 70% by weight based on the copolymer as a whole.

The slurry polymerization method gives a propylene block copolymer having a second segment content of 10 to 30% by weight, and the gas phase polymerization method gives a propylene block copolymer having a second segment content of 10 to 70% by weight.

In the gas phase polymerization method, a propylene block copolymer of which the second segment content is larger can be prepared by a process disclosed in JP-A-1-98604, and such a copolymer can be suitably used in a field ultrahigh impact resistance is required.

The intrinsic viscosity of the second segment in decalin at 135° C. should be changed depending upon production efficiency, physical properties of a product powder and an intrinsic viscosity of the first segment. In general, however, it is 3–8 dl/g for the slurry polymerization method and 1 to 5 dl/g for the gas phase polymerization method.

As the polyolefin resin in the present invention, a variety of modified polyolefins are preferred. Preferred modified polyolefins are as follows.

That is, such modified polyolefins are those obtained by modifying polyolefins with a compound (a) simultaneously having a carbon-carbon double bond or carbon-carbon triple bond and at least one member selected from carboxyl, acid anhydride, acid amide, imide, carboxylic acid ester, epoxy, amino and hydroxyl groups in the molecule in the presence or absence of a radical initiator.

Further, such preferred modified polyolefins are those obtained by modifying polyolefins with the above compound (a) alone or a combination of said compound (a) with a vinyl or vinylidene compound (b) in the presence or absence of a radical initiator.

Specific examples of the compound (a) are maleic anhydride, maleic acid, fumaric acid, maleimide, maleic acid hydrazide, reaction products between maleic acid and diamine such as those having the following formulae,

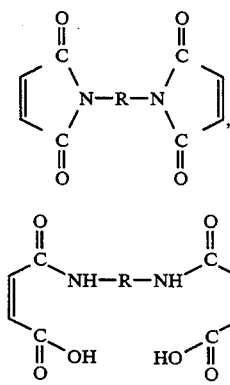

wherein R is an aliphatic or aromatic group; methyl nadic acid; dichloromaleic anhydride; maleic acid amide; natural fats and oils such as soybean oil, tung oil, castor oil, linseed oil, hempseed oil, cotton seed oil, sesame oil, rapeseed oil, peanut oil, camellia oil, olive oil, coconut oil, sardine oil, etc.; epoxidized natural fats and oils such as epoxidized soybean oil, etc.; unsaturated carboxylic acids such as acrylic acid, butenoic acid, crotonic acid, vinyl acetate, methacrylic acid, pentenoic acid, angelic acid, tiglic acid, 2-pentenoic acid, 3-pentenoic acid, α-ethylacrylic acid, β-methylcrotonic acid, 4-pentenoic acid, 2-hexenoic acid, 2-methyl-2-pentenoic acid, 3-methyl-2-pentenoic acid, α-ethylcrotonic acid, 2,2-dimethyl-3-butenoic acid, 2-heptenoic acid, 2-octenoic acid, 4-decenoic acid, 9-undecenoic acid, 10-undecenoic acid, 4-dodecenoic acid, 5-dodecenoic acid, 4-tetradecenoic acid, 9-tetradecenoic acid, 9-hexadecenoic acid, 2-octadecenoic acid, 9-octadecenoic acid, eicosenoic acid, docosenoic acid, erucic acid, tetracosenoic acid, mycolipenic acid, 2,4-pentadienoic acid, 2,4-hexadienoic acid, diallylacetic acid, geranic acid, 2,4-decadienoic acid, 2,4-dodecadienoic acid, 9,12-hexadecadienoic acid, 9,12-octadecadienoic acid, hexadecatrienoic acid, linoleic acid, linolenic acid, octadecatrienoic acid, eicosadienoic acid, eicosatrienoic acid, eicosatetraenoic acid, recinoleic acid, eleostearic acid, oleic acid, eicosapentaenoic acid, erucinic acid, docosadienoic acid, docasatrienoic acid, docosatetraenoic acid, docosapentaenoic acid, tetracosenoic acid, hexacosenoic acid, hexacodienoic acid, etc.; esters, acid amides and anhydrides of these unsaturated carboxylic acids; unsaturated alcohols such as allyl alcohol, crotyl alcohol, methyivinylcarbinol, allylcarbinol, methylpropenylcarbinol, 4-penten-1-ol, 10-undecen-1-ol, propargyl alcohol, 1,4-pentadien-3-ol, 1,4-hexadien-3-ol, 3,5-hexadien-2-ol, 2,4-hexadien-1-ol, an alcohol of the formula $C_nH_{2n-5}OH$, $C_nH_{2n-7}OH$ or $C_nH_{2n-9}OH$ in which n is a positive integer, 3-butene-1,2-diol, 2,5-dimethyl-3-hexene-2,5-diol, 1,5-hexadiene-3,4-diol, 2,6-octadiene-4,5-diol, etc.; unsaturated amines in which the OH groups of these unsaturated alcohols are replaced with —$NH_2$ groups; adducts of a low molecular weight polymer having an average molecular weight, e.g. of 500 to 10,000 or a high molecular weight polymer having an average molecular weight, e.g. of more than 10,000 with maleic anhydride or phenols; and compounds obtained by introducing an amino, carboxylic acid, hydroxyl or epoxy group. Of these compounds, carboxylic acids or anhydrides thereof are preferred, and maleic acid or an anhydride thereof is most preferred.

Specific examples of the compound (b) are aromatic vinyl or vinylidene compounds such as α-methylstyrene, o-, m- or p-methylstyrene, chlorostyrene, bromostyrene, divinylbenzene, hydroxystyrene, aminostyrene, etc.; olefins such as ethylene; acrylic acid ester or methacrylic acid ester compounds such as methyl acrylate, methyl methacrylate, ethyl acrylate, ethyl methacrylate, propyl acrylate, propyl methacrylate, octyl acrylate, octyl methacrylate, etc.; cyanovinyl compounds such as acrylonitrile, methacrylonitrile, etc.; vinyl ester compounds such as vinyl acetate; vinyl ether compounds such as methyl vinyl ether, ethyl vinyl ether, butyl vinyl ether etc.; unsaturated halogen compounds such as vinyl chloride, vinylidene chloride, etc.; and the like. These compounds may be used alone or in combination. Of these compounds, preferred are aromatic vinyl or vinylidene compounds and acrylic or methacrylic acid esters. More preferred is styrene, divinylbenzene, methyl acrylate or methyl methacrylate, and the most preferred is styrene.

The amount of the above compound (a) for use per 100 parts by weight of the polyolefin is generally 0.01 to 30 parts by weight, preferably 0.05 to 20 parts by weight, more preferably 0.1 to 10 parts by weight. The amount of the vinyl and/or vinylidene compound (b) for use is 0.1 to 200 parts by weight, preferably 0.5 to 100 parts by weight, more preferably 1 to 50 parts by weight.

The modified polyolefin can be produced according to a known method. The method for the production of a modified polypropylene is detailed below.

A graft monomer can be grafted to polypropylene according to a variety of known methods.

For example, one grafting method comprises mixing polypropylene with a graft monomer and a radical generator and melt-kneading the resultant mixture in a melt-kneader. Another grafting method comprises dissolving polypropylene in an organic solvent such as xylene, adding a radical initiator under nitrogen atmosphere, allowing the resultant mixture to react with stirring under heat, cooling the reaction mixture, washing it, filtering it and drying the resultant product. Further another method comprises irradiating polypropylene with UV ray or radiation in the presence of a graft monomer, or bringing polypropylene into contact with oxygen or ozone.

In view of economical benefit, most preferred is the grafting method which comprises melt-kneading a monomer mixture in a melt-kneader.

The melt-kneading can be carried out with an extruder, a Banbury mixer or a kneader in the presence of an unsaturated carboxylic acid or the derivative thereof and optionally, a radical initiator together with polypropylene at a temperature of 150° to 300° C., preferably 190° to 280° C. for a residence time of 0.3 to 10 minutes, preferably 0.5 to 5 minutes. It is industrially advantageous to continuously produce the modified polypropylene by means of a single or twin screw extruder with keeping its vent hole portion in a vacuum state and removing unreacted components (unsaturated carboxylic acid or its derivative, unsaturated aromatic monomer, radical initiator, etc.) and by-products such as oligomers and decomposition products thereof. The atmosphere for the reaction may be air. In general, however, the reaction is preferably carried out in an atmosphere of an inert gas such as nitrogen, carbon dioxide, etc. As an additional step to remove a trace amount of unreacted components and by-products contained in the graft polypropylene, the graft polypropylene may be subjected to heat treatment at not lower than 60° C., solvent extraction and vacuuming while it is melted.

A variety of additives may be optionally added to the graft polypropylene during the modification or post-treatment. Examples of such additives are an antioxidant, a heat stabilizer, a light stabilizer, a nucleating agent, a lubricant, an antistatic agent, an inorganic or organic colorant, a rust preventive, a crosslinking agent, a foaming agent, a plasticizer, a fluorescent agent, a surface treating agent, a surface brightener, etc.

Examples of the unsaturated carboxylic acid or the derivative thereof, used for said graft polypropylene, are unsaturated carboxylic acids as acrylic acid, methacrylic acid, maleic acid, itaconic acid, citraconic acid, bicyclo[2,2,2]hepta-5-ene-2,3-dicarboxylic acid (himic acid), bicyclo[2,2,2]octa-5-ene-2,3-dicarboxylic acid, 4-methylcyclohex-4-ene-1,2-dicarboxylic acid, 1,2,3,4,5,8,9,10-octahydronaphthalene -2,3-dicarboxylic acid, bicyclo[2,2,1]oct-7-ene-2,3,5,6-tetracarboxylic acid, 7-oxabicyclo [2,2,1]-hept-5-ene-2,3-dicarboxylic acid, etc.; and acid anhydrides, esters, amides, imides and metal salts of the unsaturated carboxylic acids such as maleic anhydrides, itaconic anhydride, citraconic anhydride, bicyclo[2,2,1]-hep-5-ene-2,3-dicarboxylic acid anhydride (himic anhydride), monoethyl maleate, monomethyl fumarate, monomethyl itaconate, dimethylaminoethyl methacrylate, dimethylaminopropylacrylamide, acrylamide, methacrylamide, maleic acid monoamide, maleic acid diamide, maleic acid-N-monoethylamide, maleic acid-N,N-diethylamide, maleic acid-N,N-monobutylamide, maleic acid-N,N-dibutylamide, fumaric acid monoamide, fumaric acid diamide, fumaric acid-N-monoethylamide, fumaric acid-N,N-diethylamide, fumaric acid-N-monobuylamide, fumaric acid-N,N-dibutylamide, maleimide, N-butylmaleimide, N- phenylmaleimide, sodium acrylate, sodium methacrylate, potassium acrylate, potassium methacrylate, etc.

Of these, maleic anhydride is most preferred.

As an unsaturated aromatic monomer for use in said graft polypropylene, styrene is most preferred. o-Methylstyrene, p-methylstyrene, m-methylstyrene, α-methylstyrene, vinyltoluene and divinylbenzene may be also used. These monomers may be used in combination.

The graft polypropylene can be produced in the absence of a radical initiator. In general, however, it is produced preferably in the presence of a radical initiator. Known radical initiators are usable as such. Examples of the radical initiator are azo compounds such as 2,2'-azobisisobutyronitrile, 2,2'-azobis[2,4,4]-trimethylvaleronitrile, etc.; and various organic peroxides such as methyl ethyl ketone peroxide, cyclohexanone peroxide, 3,3,5-trimethylcyclohexanone peroxide, 2,2-bis(t-butylperoxy)butane, t-butyl hydroperoxide, cumene hydroperoxide, diisopropylbenzene hydroperoxide, 2,5-dimethylhexane-2,5-dihydroperoxide, di-t-butyl peroxide, 1,3-bis(t-butylperoxyisopropyl)benzene, 2,5-dimethyl-2,5-di(t-butylperoxy)hexane, 2,5-dimethyl-2,5-di(t-butyl]peroxy)hexyne-3, lauroyl peroxide, 3,3,5-trimethylhexanoyl peroxide, benzoyl peroxide, t-butyl peracetate, t-butylperoxyisobutyrate, t-butyloxypivarate, t-butyloxy-2-ethylhexanoate, t-butylperoxy-3,5,5-trimethylhexanoate, t-butylperoxylaurate, t-butylperoxybenzoate, di-t-butylperoxyisophthalate, 2,5-dimethyl-2,5-di(benzoylperoxy)hexane, t-butylperoxymaleic acid, t-butylperoxyisopropyl carbonate, polystyrene peroxide, etc.

In the method for the production of said graft polypropylene, the melt flow rate of the polypropylene as a starting material (crystalline propylene homopolymer, crystalline propylene-ethylene/α-olefin block copolymer and crystalline propylene-α-olefin random copolymer) is 0.05 to 60 g/10 minutes, preferably 0.1 to 40 g/10 minutes. Further, it is desirable to select polypropylene as a starting material so that the melt flow rate of the resultant graft polypropylene is 0.1 to 100 g/10 minutes, preferably 0.5 to 50 g/10 minutes. The polypropylene as a starting material has a number average molecular weight of 7,000 to 800,000, preferably 10,000 to 700,000.

In the method for the production of said graft polypropylene, the amount of each component per 100 parts by weight of the polypropylene are as follows. The amount of the unsaturated carboxylic acid or a derivative thereof is preferably 0.01 to 10 parts by weight, more preferably 0.01 to 5 parts by weight; that of the unsaturated aromatic monomer is preferably 0.01 to 10 parts by weight, more preferably 0.1 to 5 parts by weight; and that of the radical initiator is preferably 0 to 5 parts by weight, more preferably 0.001 to 2 parts by weight. When the amount of the unsaturated carboxylic acid or a derivative thereof or the unsaturated aromatic monomer is less than 0.01 part by weight, there is no remarkable effect on the modification. When it exceeds 10 parts by weight, the effect on the modification arrives at its limit, and no further effect is exhibited. Moreover, the use of such an excess amount is practically undesirable, such a large amount of the unsaturated carboxylic acid or the derivative thereof remains unreacted in the resultant polymer, which causes offensive smell and a degradation in the physical properties of the thermoplastic resin composition. The use of the radical initiator in an amount of more than 5% by weight is practically undesirable, since it gives no further remarkable effect on the graft reaction of the unsaturated carboxylic acid or the derivative thereof and since the polypropylene is decomposed to a great extent to change the fluidity (melt flow rate) greatly.

In the present invention, the graft polypropylene or the "graft polypropylene/polypropylene" composition has a melt flow rate, preferably, of 0.1 to 100 g/10 minutes, particularly preferably of 0.5 to 40 g/10 minutes.

When the modified polypropylene is used in the present invention, the resin composition of the present invention is preferably produced by preparing the modified polypropylene in advance and then mixing the modified polypropylene with other components. However, the resin composition may be produced by mixing the compounds (a) and (b), polyolefin and the other components as a whole.

The polyphenylene resin in the present invention is selected from a polyphenylene ether, a variety of modified polyphenylene ethers, a polyphenylene-containing composition, etc.

The polyphenylene ether in the present invention means a polymer obtained by oxidation-polymerizing a phenolic compound of the formula,

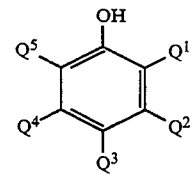

wherein each of $Q^1$, $Q^2$, $Q^3$, $Q^4$ and $Q^5$ is selected from hydrogen, halogen, hydrocarbon and substituted hydrocarbon and at least one of these is always hydrogen, with oxygen or an oxygen-containing gas in the presence of an oxidation coupling catalyst.

The above substituents $Q^1$, $Q^2$, $Q^3$, $Q^4$ and $Q^5$ are selected from hydrogen, chlorine, fluorine, bromine, iodine, methyl, ethyl, propyl, butyl, chloroethyl, hydroxyethyl, phenylethyl, benzyl, hydroxymethyl, carboxyethyl, methoxycarbonylethyl, cyanoethyl, phenyl, chlorophenyl, methylphenyl, dimethylphenyl, ethylphenyl, etc.

Specific examples of the phenolic compound of the above formula are preferably phenol, o-, m- or p-cresol, 2,6-, 2,5-, 2,4- or 3,5-dimethylphenol, 2-methyl-6-phenylphenol, 2,6-diphenylphenol, 2,6-diethylphenol, 2-methyl-6-ethylphenol, 2,3,5-, 2,3,6- or 2,4,6-trimethylphenol, etc. These phenol compounds may be used in combination.

The polyphenylene ether of the present invention may be also selected from copolymers obtained by copolymerizing other phenolic compound than that of the above formula, e.g. a dihydric phenol derivative such as bisphenol A, tetrabromobisphenol A, resorcin, hydroquinone, etc., and the phenolic compound of the above formula. Of these, a homopolymer or copolymer obtained from 2,6-dimethylphenol or 2,3,6-trimethylphenol is preferred.

The oxidation coupling catalyst used for the oxidation polymerization of the phenolic compound is not critical, and any catalyst having polymerization ability can be used. Typical examples of such a catalyst are catalysts comprising a combination of a cuprous salt with a tertiary amine such as cuprous chloride-trimethylamine, a cuprous acetate-pyridine, etc.; catalysts comprising a combination of cuprous salt-tertiary amine with an alkali metal hydroxide such as cuprous chloride-pyridine-potassium hydroxide, etc.; catalysts comprising a combination of a manganese salt with a primary amine such as manganese acetate-ethylenediamine, etc.; catalysts comprising a combination of a manganese salt with alcoholate or phenolate such as manganese chloride-sodium methylate, manganese chloride-sodium phenolate, etc.; catalysts comprising a combination of a manganese salt, alkali hydroxide and an amine such as manganese chloride-NaOH-diethanolamine-dibutylamine, manganese chloride-NaOH-triethanolamine-dibutylamine, manganese chloride-NaOH-monoethanolamine-dibutylamine, etc.; catalysts comprising a combination of a cobalt salt with a tertiary amine, and the like.

The intrinsic viscosity of the polyphenylene ether (measured in chloroform at 30° C.) is not critical. In general, however, this intrinsic viscosity is preferably 0.2 to 1.0 dl/g, more preferably 0.25 to 0.6 dl/g, and an optimum intrinsic viscosity may be selected case by case.

As the polyphenylene ether resin, it is preferable to use a modified polyphenylene ether obtained by modifying polyphenylene ether with a variety of compounds. A polyfunctional compound, an organosilane compound, etc., are preferred as a compound for the polyphenylene modification.

The polyfunctional compound means a compound (E) having at least one carboxyic acid anhydride, acid amide, imide, carboxylic acid ester, epoxy, amino or hydroxyl group in the molecule. The compound (E) is preferably selected from compounds (F) which simultaneously have (a) a carbon-carbon double bond or a carbon-carbon triple bond and (b) at least one carboxyl, acid anhydride, acid amide, imide, carboxylic acid ester, epoxy, amino or hydroxyl group. The compound (F) is identical with the compound (a) used for the polyolefin modification.

Another preferred example of the polyfunctional compound is a compound (G) selected from aliphatic carboxylic acids, acid esters and acid amides of the formula,

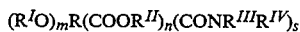

wherein R is a linear or branched aliphatic unsaturated hydrocarbon group having 2 to 20 carbon atoms, $R^I$ is hydrogen or one member selected from the class consisting of an alkyl group having 1 to 10 carbon atoms and aryl, acyl and carbonyldioxy groups, each of $R^{II}$ is independently hydrogen or one member selected from the class consisting of an alkyl group having 1 to 20 carbon atoms and an aryl group, each of $R^{III}$ and $R^{IV}$ is independently hydrogen or one member selected from the class consisting of an alkyl group having 1 to 10 carbon atoms and an aryl group, and m, n and s are integers of not less than 0 in which $m+n+s \geq 2$, and derivatives of these.

Specific examples of the compound (G) are hydroxyacetic acid, lactic acid, α-hydroxy-n-butyric acid, α-hydroxyisobutyric acid, α-hydroxy-n-valeric acid, α-oxyisovaleric acid, 2-hydroxy-2-methylbutanoic acid, α-hydroxy-n-caproic acid, α-hydroxyisocaproic acid, 2-ethyl-2-hydroxybutanoic acid, 2-hydroxy-3,3-dimethylbutanoic acid, 2-hydroxy-2-methylpentanoic acid, 2-hydroxy-5-methylhexanoic acid, 2-hydroxy-2,4-dimethylpentanoic acid, 3-hydroxypropionic acid, β-hydroxybutyric acid, β-hydroxyisobutyric acid, β-hydroxy-n-valeric acid, β-hydroxyisovaleric acid, 2-hydroxymethylbutanoic acid, hydroxypivalic acid, 3-hydroxy-2-methylpentanoic acid, 11-hydroxytetradecanoic acid, jalapinolic acid, 14-hydroxyhexadecanoic acid, sabinic acid, juniperic acid, hydroxymalonic acid, methyltartronic acid, ethyltartronic acid, n-propyltartronic acid, isopropyltartronic acid, hydroxymethylamlonic acid, hydroxyisopropylamlonic acid, ethylhydroxymethylmalonic acid, malic acid, α-methylmalic acid, α-hydroxy-α'-methylsuccinic acid, α-hydroxy-α',α'-dimethylsuccinic acid, α-hydroxy-α,α'-diethylsuccinic acid, α-hydroxy-α'-ethylsuccinic acid, α-hydroxy-α'-ethylsuccinic acid, α-hydroxy-α'-methyl-α-ethylsuccinic acid, trimethylmalic acid, α-hydroxyglutaric acid, β-hydroxyglutaric acid, β-hydroxy-β-methylglutaric acid, α-hydroxyadipic acid, citric acid, isocitric acid, norcaperatic acid, agaricic acid, glyceric acid, α,β-dihydroxybutyric acid, β,β'-dihydroxyisobutyric acid, β,γ-dihydroxybutyric acid, α,γ-dihydroxy-β,β-dimethylbutyric acid, α,β-dihydroxy-α-isopropylbutyric acid, ipurolic acid, ustilic acid-A,9,10-dihydroxyoctadecanoic acid, tartaric acid (optically active compound or racemic mixture), mesotartaric acid, α,β-dihydroxyglutaric acid, α,γ-dihydroxyglutaric acid, α,γ-dihydroxy-β-methylglutaric acid, α,γ-dihydroxy-β-methyl-β-ethylglutaric acid, α,γ-dihydroxy-α,γ-dimethylglutaric acid, α,δ-dihydroxyadipic acid, β,γ-dihydroxyadipic acid, 6,7-dihydroxydodecanoic diacid, 7,8-dihydroxyhexadecanoic diacid, phloionic acid, trihydroxybutyric acid, trihydroxyisobutyric acid, trihydroxyglutaric acid, succinic acid, glutaric acid, adipic acid, α-methylglutaric acid, dodecanoic diacid, etc.

The above term "derivatives" of the compound of the above formula means lactones, acid anhydrides, alkali metal salts, alkaline earth metal salts, amine salts, etc. Specific examples thereof are β-propiolactone, glycoside, lactide, β-methylpropiolactone, β,β-dimethyl propiolactone, β-n-propylpropiolactone, β-isopropylpropiolactone, β-methyl-β-ethylpropiolactone, γ-butyrolactone, γ-valerolactone, δ-valerolactone, δ-caprolactone, ε-caprolactone, 15-hydroxypentadecanoic acid latone, γ-butyrolactone-α-carboxylic acid, paraconic acid, α-methylparaconic acid, β-methylparaconic acid, α-ethylparaconic acid, α-isopropylparaconic acid, γ-methylparaconic acid, γ-ethylparaconic acid, α,γ-dimethylparaconic acid, β,γ-dimethylparaconic acid, α,α,β-trimethylparaconic acid, γ,γ-dimethylparaconic acid, naphrosteraic acid, γ-valerolactone-γ-carboxylic acid, γ-isopropyl-γ-butyrolactone-γ-carboxylic acid, α,α-dimethyl-γ-butyrolactone-γ-carboxylic acid, β-methyl-γ-valerolactone-γ-carboxylic acid, α,β-dimethyl-γ-valerolactone-γ-carboxylic acid, α,β-dimethyl-γ-butyrolactone-γ-carboxylic acid, homoisocarpic acid, α-(γ-hydroxycarbonylpropyl)-γ-butyrolactone, β-hydroxyadipic acid, γ-lactone, α,δ-dimethyl-β-hydroxyadipic acid-γ-lactone, β-hydroxy-β-methyladipic acid-γ-lactone, α-(δ'-carboxy-n-butyl)-γ-butyrolactone, α-methylisocitric acid lactone, cinchonic acid, α-hydroxy-γ-butyrolactone, β-hydroxy-γ-butyrolactone, δ-hydroxy-γ-valerolactone, pantolactone, mevalonic acid, malic anhydride, tartaric anhydride, hydroxyglutaric anhydride, α,β,γ-trioxyvaleric acid lactone, α-hydroxy-α-hydroxymethyl-γ-butyrolactone, succinic anhydride, glutaric anhydride, etc. These may be used alone or in combination.

Of the above compounds, tartaric acid, malic acid, citric acid and derivatives of these are particularly preferred, including their products in a commercially available form (e.g. acids in an anhydrous or hydrated state). Examples of useful derivatives thereof are acetyl citrate, monostearyl citrate, distearyl citrate, N,N'-diethylcitric acid amide, N,N'-dipropylcitric acid amide, N-phenylcitric acid amide, N-dodecylcitric acid amide, N,N'-didodecylcitric acid amide, N-dodecylcitric acid amide, calcium malate, calcium citrate, potassium malate and potassium citrate.

Further another preferred example of the polyfunctional compound is a compound (H) having (a) an acid halide group, most preferably an acid chloride group and (b) at least one carboxyl acid, carboxylic anhydride, acid ester or acid amide group, preferably a carboxylic acid or carboxylic anhydride group in the molecule.

Specific examples of the compound (H) are anhydrotrimellitic acid chloride, chloroformylsuccinic acid anhydride, chloroformylsuccinic acid, chloroformylglutaric acid anhydride, chloroformylglutaric acid, chloroacetylsuccinic acid anhydride, chloroacetylsuccinic acid, trimellitic acid chloride and chloroacetylglutaric acid. Of these compounds, anhydrotrimellitic acid chloride is preferred.

These compounds (F), (G) and (H) are specified in U.S. Pat. Nos. 4,315,086 and 4,264,358 (these Patents are cited as part of the present specification).

Still another preferred examples of the polyfunctional compound are as follows: a high molecular weight compound (J) obtained by condensation of a compound having an oxirane group in the molecule, a dihydric phenol and epichlorohydrin. Specific examples of the compound (J) are epoxidized compounds of olefins such as ethylene oxide, propylene oxide, cyclohexene oxide, etc., or cycloalkenes, and the like; a polyfunctional compound obtained by condensation of a dihydric phenol and epichlorohydrin in various proportions. Typical examples thereof are condensates of bisphenol A and epichlorohydrin (e.g., Sumiepoxy ™ ELA-115, ELA-127, ELA-128, ELA-134, ESA-011, ESA-014, ESA-017, ESA-019, etc., trade names of Sumitomo Chemical Co., Ltd.), condensates of resorcin and epichlorohydrin, condensates of hydroquinone and epichlorohydrin, condensates of tetrabromobisphenol A and epichlorohydrin, and glycidyl-etherified products of phenol or cresol novolak (e.g. Sumiepoxy ESCN-220 ™ series, supplied by Sumitomo Chemical Co., Ltd.).

Typical examples of condensate of a polyhydric alcohol and epichlorohydrin are condensates of epichlorohydrin and polyhydrin alcohol such as ethylene glycol, propylene glycol, butylene glycol, polyethylene glycol, polypropylene glycol, glycerin, trimethylolpropane, pentaerythritol, etc.

Glycidyl-etherified product of a monohydric phenol or a monohydric alcohol. Examples of such a product are phenyl glycidyl ether, butyl glycidyl ether, cresyl glycidyl ether, etc.

Glycidyl product of an amine compound (e.g. Sumiepoxy ™ ELN-125, trade name, diglycidyl product of aniline, supplied by Sumitomo Chemical Co., Ltd.).

High molecular weight compound of an epoxy-containing unsaturated compound (e.g. glycidyl acrylate, glycidyl methacrylate and acryl glycidyl ether), copolymer of an epoxy-containing unsaturated compound and at least one monomer (e.g. ethylene, propylene, butene, styrene, α-methylstyrene, 4-methylpentene, chlorostyrene, bromostyrene, acrylic acid, acrylic ester, acrylonitrile, vinyl chloride, methacrylic acid, methacrylic ester, maleic anhydride, vinyl acetate, etc.). Of these high molecular weight compounds, particularly preferred are a styrene-glycidyl acrylate copolymer, a styrene-glycidyl methacrylate copolymer, an ethylene-glycidyl acrylate copolymer and an ethylene-glycidyl methacrylate copolymer.

The organosilane compound used in the present invention is a compound (K) which simultaneously has, in the molecule, (a) at least one silicon atom bonded to its carbon atom through an oxygen atom, (b) a carbon-carbon double or triple bond and (c) at least one functional group selected from amino, mercapto, carboxylic acid, acid anhydride, acid amide, carboxylic acid ester, imide and hydroxyl groups.

In the above compound (K), the C-O-Si component is generally present as an alkoxy or acetoxy group directly bonding to a silicon atom. Such an alkoxy or acetoxy group generally has less than 15 carbon atoms, and may contain hetero atom(s) (e.g. oxygen). The compound (K) may contain two or more silicon atoms. When a plurality of such silicon atoms are present, the silicon atoms bonds to oxygen (e.g. in siloxane), form a silicon-silicon bond, or form a bond through a difunctional organic group (e.g. methylene or phenylene group).

Examples of the above compound (K) are preferably γ-aminopropyltriethoxysilane, 2-(3-cyclohexenyl)ethyltrimethoxysilane, 1,3-divinyltetraethoxysilane, vinyltris(2-methoxyethoxy)silane, 5-bicycloheptenyltriethoxysilane and γ-mercaptopropyltrimethoxysilane. The amount of the compounds (E) to (K) are selected depending upon a purpose. In general, this amount per 100 parts by weight of the polyphenylene ether is not more than 200 parts by weight, preferably not more than 80 parts by weight, more preferably not more than 20 parts by weight, most preferably 0.01 to 10 parts by weight.

When the polyphenylene ether is modified with the above compound (E), (F), (G), (H), (J) or (K), a radical generating agent may be present case by case. The radical generating agent is selected from known organic peroxides and diazo compounds. Specific examples of such a radical generating agent are preferably benzoyl peroxide, dicumyl peroxide, di-tert-butyl peroxide, tert-butylcumyl peroxide, tert-butyl hydroperoxide, cumene hydroperoxide, azobisisobutyronitrile, etc. The amount of the radical generating agent per 100 parts by weight of the polyphenylene ether is 0.01 to 10 parts by weight, preferably 0.1 to 5 parts by weight.

The modified polyphenylene ether in the present invention may be a product obtained by a chemical reaction between the above compound and a polyphenylene or by mutual action of these to each other (e.g. physical adsorption onto the polyphenylene ether).

Further, another example of the modified polyphenylene ether preferred in the present invention is a graft polymer obtained by graft-polymerizing an unsaturated monomer other than the said polyfunctional compound (F) having an unsaturated group or a combination of the polyfunctional compound (F) having an unsaturated group with other unsaturated monomer to the polyphenylene ether in the presence of a radical initiator.

Such an unsaturated monomer is preferably a vinyl and/or vinylidene compound(s) (L). The compound(s), (L) is selected from those compounds specified as examples of the compound (b) used for the polyolefin modification.

These compounds may be used alone or in combination, and, preferred as an unsaturated monomer for the graft polymerization are styrene, styrene-glycidyl methacrylate, styrene-glycidyl acrylate, styrene-maleic anhydride, styrene acrylic acid and styrene-methacrylic acid.

In the present invention, the amount of the compound(s) (L) per 100 parts by weight of the polyphenylene ether is not more than 200 parts by weight, preferably 0.5 to 100 parts by weight, more preferably 1 to 50 parts by weight.

The method for the production of the modified polyphenylene ether in the present invention is not critical, and known methods can be employed. For example, there are some methods in which:

(1) the polyphenylene ether and the above compound in the form of pellets, powders or flakes are uniformly mixed with a high-speed stirrer, and then the resultant mixture is melt-kneaded, (2) the above compound is dissolved or swollen in a solution in which the polyphenylene ether is dissolved or swollen, and these components are heated with stirring, or (3) the above compound is added to the polyphenylene ether, and the resultant mixture is dispersed in water and heated with stirring.

In the method (3), it is preferable to use a dispersion stabilizer such as polyvinyl alcohol, sodium dodecylbenzenesulfonate, calcium phosphate, etc. A solvent to dissolve or swell the polyphenylene ether may be added as required.

In the method (1), the temperature and time for the melt-kneading are not critical. Differing to some extent depending upon the compound(s) and its amount, the temperature is generally set between 150° C. and 350° C. Any melt-kneading apparatus may be used if a molten viscous substance can be handled, and any of a batch method and a continuous method may be employed. Specific examples of the apparatus are a single or twin-screw extruder, a Banbury mixer, a roll, a kneader, etc.

In the methods (2) and (3), the solvent is not critical, and any solvent may be used if it can dissolve or swell the polyphenylene ether.

Specific examples of the above solvent are chloroform, methylene chloride, benzene, xylene, chlorobenzene, cyclohexane, styrene, toluene, o-chlorophenol, etc. A mixture of these may also be used if it can dissolve or swell the polyphenylene ether. The temperature and time for the above modification in these methods are not critical, and in general, the modification is carried out at a temperature of 20° to 250° C. for a time of 1 minute to 10 hours.

The "saturated polyester resin" in the present invention comprises a dicarboxylic acid component, at least 40 mol % of which is formed of a terephthalic acid, and a diol component. The other portion of the dicarboxylic acid component than the above terephthalic acid is selected from aliphatic dicarboxylic acids having 2 to 20 carbon atoms such as adipic acid, sebacic acid, dodecane dicarboxylic acid, etc., aromatic dicarboxylic acids such as isophthalic acid, naphthalene dicarboxylic acid, etc., alicyclic dicarboxylic acids such as cyclohexane dicarboxylic acid, etc., and these are used alone or as a mixture. The above diol component is selected from aliphatic glycols and alicyclic glycols such as 1,3-propanediol, 1,4-butanediol, 1,6-hexanediol, 1,10-decanediol, 1,4-cyclohexanediol, etc., and these glycols are used alone or as a mixture.

Of these saturated polyester resins, polybutylene terephthalate or polyethylene terephthalate particularly produces the effect of the present invention more desirably. These saturated polyester resins preferably have an inherent viscosity, measured in a o-chlorophenol at 25° C., of 0.5 to 3.0 dl/g, and a saturated polyester resin having an inherent viscosity outside this range cannot give the intended mechanical strength.

III Modifier (D)

Specific examples of the modifier (D), the carboxylic acid having at least two carboxyl groups in the molecule or the derivative thereof, are succinic acid, glutaric acid, adipic acid, pimelic acid, suberic acid, azelaic acid, nonamethyl dicarboxylic acid, undecamethylene dicarboxylic acid, dl-methylsuccinic acid, methylmalonic acid, ethylmalonic acid, dimethylmalonic acid, dl-methylsuccinic acid, tetramethylsuccinic acid, pinaconic acid, d-camphoric acid, acetylmalic anhydride, isovaleric anhydride, isobutyric anhydride, succinic anhydride, heptanoic anhydride, methylsuccinic anhydride, butyric anhydride, d-tartaric acid, l-tartaric acid, d-saccharic acid, mucic acid, l-malic acid, dihydroxytartaric acid, dl-citramalic acid, dl-bromosuccinic acid, calcium l-malate, dl-1,2-dibromosuccinic acid, 1,4-pyrron-2,6-dicarboxylic acid, diethyl l-malate, DL-aspartic acid, dl-isocamphoric acid, diglycollic acid, 1-1-cyclopropane dicarboxylic acid, dl-citramalic acid, oxalic acid, etc.

Specific examples of the amine containing at least two nitrogen atoms in the molecule are hexamethylenediamine, hexamethylenetetramine, polyalkylenepolyamine, phenylenediamine, 4,4'-diaminodiphenyl compounds, m-xylylenediamine, aniline, toluidine derivatives such as N-alkyl or phenyl anilines, and the like.

The modifier (D) is also selected from urea $CO(NH_2)_2$ and the derivatives thereof. Examples of these derivatives are sym-diethylurea, ethylurea, sym-dimethylurea, unsym-diethylurea, acetylurea, acetylmethylurea, sym-ethylphenylurea, phenylurea, sym-diphenylrea, benzylurea, tetraphenylurea, benzoylurea, p-ethoxyphenylurea, ethyleneurea, thiourea, allythiourea, sym-dimethylthiourea, sym-diethylthiourea, sym-diphenylthiourea, phenylthiourea, benzylthiourea, s-benzylisothiourea, etc.

The polyamides of low molecular weight as a modifier (D) have a number average molecular weight of 400 to 9,000, and can usually be industrially obtained.

IV Rubbery Substance and Modified Rubbery Substance

The rubbery substances and the modified rubbery substances will be described hereinbelow.

In the present invention, a rubbery substance or a modified rubbery substance is used in order to improve the thermoplastic resin composition in impact resistance, particularly in low-temperature impact resistance. The rubbery substance can be selected from ethylene copolymer rubbers, propylene-butene rubbers, isoprene-butylene rubbers, polyisoprenes, polybutadienes, styrene block copolymers such as styrene-butadiene rubbers, styrene-butadiene-styrene block copolymers, partially hydrogenated styrene-butadiene block copolymers, styrene-isoprene block copolymers, partially hydrogenated styrene-isoprene block copolymers, etc., linear low-density polyethylene, and the mixtures of these.

Examples of the ethylene copolymer rubbers are ethylene-α-olefin copolymer rubbers or ethylene-α-olefin-nonconjugated diene copolymer rubbers, of which the typical examples are ethylene-propylene copolymer rubbers (to be abbreviated as "EPM" hereinafter) and ethylene-propyiene-nonconjugated diene copolymer rubbers (to be abbreviated to as "EPDM" hereinafter), ethylene-vinyl acetate copolymers, ethylene-methyl acrylate copolymers, ethylene-methyl methacrylate copolymers, ethylene-ethyl acrylate copolymers, ethylene-ethyl methacrylate copolymers, ethylene-butyl acrylate copolymers, ethylene-butyl methacrylate copolymers, copolymers of ethylene and either acrylic acid or its partial metal salt, copolymers of ethylene and either methacrylic acid or its partial metal salt, ethylene-acrylic acid-acrylic ester copolymers, ethylene-acrylic acid-methacrylic acid copolymers, ethylene-methacrylic acid-methacrylic acid copolymers, ethylene-vinyl alcohol copolymers, ethylene-vinyl acetate-vinyl alcohol copolymers, ethylene-styrene copolymers, etc. Also, these ethylene copolymer rubbers can be used in combination. Further, the ethylene copolymer rubber can be used as a mixture with a low-density or high-density polyethylene which is well compatible with it.

The modified rubbery substance can be obtained by graft copolymerization of the above rubbery substance and either the compound (a) used as a modifying monomer for the afore-described modified polyolefin or a combination of the compounds (a) and (b) used as a modifying monomer for the afore-described modified polyolefin, in the optional presence of a radical initiator, or alternatively by direct introduction of an unsaturated carboxylic acid or the derivative thereof into an α-olefin main chain in the presence of a polymerization initiator and a catalyst.

As a starting rubbery substance for the above rubbery substance or modified rubbery substance, the ethylene copolymer rubber and the styrene copolymer rubber are preferred.

Of the ethylene copolymer rubbers, particularly preferred are ethylene-α-olefin copolymer rubbers and ethylene-α-olefin nonconjugated diene copolymer rubbers. Examples of the ethylene-α-olefin copolymer rubbers include copolymers of ethylene with another α-olefin such as propylene, 1-butene, 1-pentene, 1-hexene, 4-methyl -1-pentene, 1-octene or the like and terpolymer rubbers such as ethylene-propylene-1-butene copolymers. Of these, ethylene-propylene copolymer rubbers and ethylene-1-butene copolymer rubbers are preferred. Ethylene-α-olefin-nonconjugated diene copolymer rubbers can be also used. However, it is preferable to adjust the nonconjugated diene content in the starting material rubber to not more than 3% by weight. When the nonconjugated diene content exceeds 3% by weight, the composition undesirably undergoes gelation when it is kneaded.

The ethylene content in the ethylene-α-olefin copolymer rubber is usually 15 to 85% by weight, preferably 40 to 80% by weight. That is, a highly crystalline polymer having an ethylene content of more than 85% by weight tends to be difficult to process under ordinary rubber-forming conditions. On the other hand, a highly crystalline polymer having an ethylene content of less than 15% by weight sometimes shows an increase in glass transition temperature (Tg), and sometimes undesirably loses rubber properties.

The ethylene-α-olefin copolymer rubber preferably has a number average molecular weight of 10,000 to 100,000, with which it can be kneaded in an extruder. When the molecular weight thereof is too low, the ethylene-α-olefin copolymer rubber tends to be difficult to handle when fed to an extruder, and when it is too high, the ethylene-α-olefin copolymer rubber sometimes shows a low fluidity and causes difficulty in processing.

The molecular weight distribution of the ethylene-α-olefin copolymer rubber is not critical. In general, there can be used any of generally manufactured and commercially available copolymer rubbers having a variety of molecular weight distributions such as a monomodal distribution and a bimodal distribution.

The Q value (weight average molecular weight/number average molecular weight) of the molecular weight distribution is preferably in the range of 1 to 30, more preferably 2 to 20.

The above copolymer rubber includes that produced in the presence of a Ziegler-Natta catalyst, i.e. a usually used production catalyst. For example, a combination of an organoaluminum compound with a trivalent to pentavalent vanadium compound soluble in a hydrocarbon solvent is used as a Ziegler-Natta catalyst. The aluminum compound can be selected from alkylaluminum sesquichloride, trialkylaluminum, dialkylaluminum monochloride, and mixtures of these. The vanadium compound can be selected from vanadium oxytrichloride, vanadium tetrachloride and a vanadate compound of the formula $VO(OR^3)_q X_{3-q}$ ($0 < q \leq 3$, $R^3$ is a linear, branched or cyclic hydrocarbon having 1 to 10 carbon atoms, and X is a halogen selected from Cl, Br and I).

Of the styrene block copolymers, particularly preferred is a partially hydrogenated styrene-butadiene block copolymer. The partially hydrogenated styrene-butadiene block copolymer is produced by partial hydrogenation of a styrene-butadiene block copolymer. The structure and production process thereof are described below.

In the partially hydrogenated styrene-butadiene block copolymer, the number average molecular weight of the block copolymer rubber is usually 10,000 to 1,000,000, preferably 20,000 to 300,000, the number average molecular weight of the unsaturated aromatic polymer block A in the block copolymer rubber is usually 1,000 to 200,000, preferably 2,000 to 100,000, the number average molecular weight of the conjugated diene polymer block B is usually 1,000 to 200,000; preferably 2,000 to 100,000, and the weight ratio of the unsaturated aromatic polymer block A to the conjugated diene polymer block B is usually 2/98 to 60/40, preferably 10/90 to 40/60.

Many processes have been proposed for the production of the block copolymer rubber. A typical process is disclosed in Japanese Patent Publication No. 40-23798, in which a block copolymer rubber of an unsaturated aromatic hydrocarbon and a diene hydrocarbon can be produced by block copolymerization in an inert solvent in the presence of a lithium catalyst or a Ziegler-Natta catalyst.

The hydrogenation of such a block copolymer rubber is carried out in an inert solvent in the presence of a hydrogenation catalyst, e.g. according to any of the methods disclosed in Japanese Patent Publications Nos. 42-8704, 43-6636 and 46-20814. The hydrogenation is carried out such that the hydrogenation ratio of the polymer block B is usually at least 50%, preferably 80% or more and that the hydrogenation ratio of the aromatic unsaturated bond in the polymer block B is not more than 25%. One typical example of such a partially or completely hydrogenated block copolymer is commercially available in the trade name of KRATON ®- G, supplied by Shell Chemical Co., U.S.A.

In the production of the modified rubbery substance, the method for graft-copolymerizing a graft monomer on the rubber substance can be selected from a variety of known methods.

For example, the graft copolymerization is carried out by a grafting method which comprises mixing a starting material rubbery substance, a graft monomer and a radical initiator and melt-kneading the mixture in a melt-kneading apparatus, or a method which comprises dissolving an ethylene copolymer rubber in an organic solvent such as xylene, adding a radical initiator under nitrogen atmosphere to allow the mixture to react under heat with stirring, cooling the reaction mixture after the reaction, washing the reaction product, filtering it and drying it thereby to obtain a grafted ethylene copolymer rubber. In addition to these, there are a method which comprises irradiating an ethylene copolymer rubber with ultraviolet light or radiation in the presence of a graft monomer, and a method which comprises bringing a rubbery substance into contact with oxygen or ozone.

In view of economical benefit, it is most preferred to employ a graft copolymerization method in which the above materials are melt-kneaded in a melt-kneading apparatus.

In the present invention, the modified rubbery substance can be obtained by melt-kneading the starting rubbery substance with the compound (a), if necessary, in the co-presence of a radical initiator, or the starting rubbery substance with the compounds (a) and (b), if necessary, in the co-presence of a radical initiator, with an extruder, Banbury mixer, kneader, or the like, at a temperature of 200° to 280° C., preferably 230° to 260° C. for a residence time of 0.2 to 10 minutes. The melt-kneading conditions vary depending upon the radical initiator used.

The presence of too large an amount of oxygen during the kneading sometimes results in formation of a gel or serious coloring. Therefore, the kneading is desirably carried out in the substantial absence of oxygen.

When the kneading temperature is lower than 200° C., the compound (a) is not sometimes grafted in such an amount as desired, and the effect on improvement in the degree of the graft reaction is usually small. When the kneading temperature is higher than 280° C., the effect on improvement in the degree of the graft reaction tends to be also small, and in some cases, formation of a gel, coloring, etc., are liable to occur.

The kneading machine for the modification is not critical. In general, an extruder is preferred since it permits continuous production, and the extruder preferably has a single screw or twin screws suitable for homogeneously kneading the starting materials.

In order to remove unreacted components (compound (a), compound (b), and by-products such as oligomers and decomposition products) from the reaction product, the reaction product can be purified by effecting vacuum pump-suction through vent lines halfway along the extruder or in a place near its outlet, or by dissolving the reaction product in a suitable solvent to precipitate it. The reaction product can be also subjected to heat treatment at a temperature of not less than 60° C. and vacuuming with melting.

The above three or four components may be separately fed to a kneading machine, or alternatively, some or all of these components may be uniformly mixed in advance of feeding them. For example, it is possible to employ a kneading method which comprises preliminarily impregnating a rubber with both a radical initiator and the compound (b), then feeding the rubber and the compound (a) at the same time and kneading the mixture. It is also possible to employ a modification method which comprises feeding a radical initiator and/or the compound (b) halfway along an extruder.

A variety of additives may be optionally added to the modified rubbery substance during the modification or post-treatment. Examples of such additives are antioxidants, heat stabilizers, light stabilizers, nucleating agents, lubricants, antistatic agents, inorganic or organic colorants, rust preventives, cross-linking agents, foaming agents, plasticizers, fluorescent agents, surface treating agents, surface brighteners, etc.

The compounds (a) and (b) and the radical initiator used to obtain the modified rubbery substance can be selected from those compounds used for the production of the modified polypropylene. As the compound (a), an unsaturated carboxylic acid or the derivative thereof is preferred, and as the compound (b), an unsaturated aromatic monomer is preferred. As the unsaturated carboxylic acid or the derivative thereof, maleic anhydride is most preferred. As the unsaturated aromatic monomer, styrene is most preferred. o-Methylstyrene, p-methylstyrene, α-methylstyrene, vinyltoluene and divinylbenzene can be also used. These can be used in combination.

In the production of said modified rubbery substance, the unsaturated aromatic monomer is used to prevent gel formation and increase the graft reaction degree. Per 100 parts by weight of the starting rubbery substance, the amount of the unsaturated aromatic monomer is preferably 0.2 to 20 parts by weight, and the amount of the unsaturated carboxylic acid or the derivative thereof is preferably 0.5 to 15 parts by weight. When the aromatic monomer is also used, the amount of the unsaturated carboxylic acid or the derivative thereof is preferably 0.5 to 15 parts by weight, and the weight ratio of the unsaturated aromatic monomer to the unsaturated carboxylic acid or the derivative thereof is preferably 0.1 to 3.0, more preferably 0.5 to 2.0.

When the weight ratio of the unsaturated aromatic monomer to the unsaturated carboxylic acid or the derivative thereof is less than 0.1, sometimes no effect is observed on prevention of gel formation and improvement in degree of the graft reaction. When the above weight ratio exceeds 3.0, sometimes no further desirable effect can be obtained.

The amount of the radical initiator for use depends on its kind and kneading conditions. In general, the radical initiator can be used in an amount of 0.005 to 1.0 part by weight, preferably 0.01 to 0.5 part by weight per 100 parts by weight of the starting material rubber. When the amount of the radical initiator is less than 0.005 part by weight, the unsaturated carboxylic acid or the derivative thereof is sometimes not grafted in an amount as desired, and the effect of combined use of the unsaturated aromatic monomer on an increase in an amount of the grafted unsaturated carboxylic acid or the derivative thereof tends to be unsatisfactory. When the above amount exceeds 1.0 part by weight, gel formation is, undesirably, liable to occur.

Preferably, the modified rubbery substance obtained above contains 0.1 to 5% by weight of the grafted unsaturated carboxylic acid or the derivative thereof and 0.1 to 5% by weight of the grafted unsaturated aromatic monomer and has a Mooney viscosity (ML$_{1+4}$121° C.) of 5 to 120.

The modified rubbery substance is also produced by another method in which the unsaturated carboxylic acid or the derivative thereof is introduced into the main chain of the starting rubber material by copolymerization in the presence of a polymerization initiator and a catalyst. In general, the modified rubbery substance can be produced by the following known high-pressure radical copolymerization method. That is, it can be produced by copolymerizing ethylene with a radical-polymerizable monomer (comonomer) in the presence of a free radical-generating agent such as organic peroxide, oxygen, etc. The copolymerization is generally carried out at a polymerization temperature of 130° to 300° C. under a polymerization pressure of 500 to 3,000 kg/cm$^2$.

The radical-copolymerizable monomer can be selected from unsaturated carboxylic acids or the esterification products thereof such as acrylic acid, methacrylic acid, etc.; vinyl esters such as vinyl acetate, etc.; and the like. Specific examples of the esterification products of unsaturated carboxylic acids are methyl acrylate, ethyl acrylate, methyl methacrylate, glycidyl acrylate, glycidyl methacrylate, etc. These comonomers can be used alone or in combination.

The comonomer content in the modified rubbery substance directly polymerized is usually 0.1 to 40% by weight, preferably 1 to 35% by weight. When the comonomer content is less than 0.1% by weight, sometimes no effect is produced on the modification.

Those specified as examples of the ethylene copolymer rubber of the starting material rubbery substance for the rubber substance and the modified rubbery substance are excluded from the scope of these copolymers.

Of these, an ethylene-acrylic acid copolymer, an ethylene-methacrylic acid copolymer, an ethylene-glycidyl acrylate copolymer and an ethylene-glycidyl methacrylate are preferred.

Further preferred are much more noncrystalline terpolymers as compared with the above copolymers obtained by copolymerizing the copolymers with unsaturated carboxylic acid esters or vinyl ester.

The modified thermoplastic resin (B) and the modified rubbery substance can be also produced by a co-graft polymerization method. The method will be specifically described with regard to the graft polypropylene (B).

The polypropylene and rubbery substance as starting materials are subjected to co-graft polymerization by simultaneously grafting on the rubbery substance an unsaturated carboxylic acid or the derivative thereof or a combination of an unsaturated carboxylic acid or the derivative thereof with an unsaturated monomer.

That is, the graft polypropylene (B) and the modified rubbery substance can be co-grafted according to a similar method to that used for individually producing the graft polypropylene (B) or the modified rubbery substance, i.e. by allowing the starting polypropylene and the starting rubbery substance to be co-present and grafting an unsaturated carboxylic acid or the derivative thereof or alternatively a mixture of an unsaturated carboxylic acid or the derivative thereof with an unsaturated aromatic monomer on the polypropylene and the rubbery substance optionally in the presence of a radical initiator. When the co-grafting polymerization is carried out, ethylene copolymer rubber or a partially hydrogenated styrene-butadiene block copolymer is most preferred as a starting rubbery substance.

The polypropylene and rubbery substance as starting materials are allowed to be co-present according to various known methods as follows. When these two starting materials are pellets, powders or pulverized products, these materials are fed into a co-modifying apparatus such as an extruder separately or through the same feeding port to allow them to be co-present in the apparatus, or these materials are preliminarily uniformly mixed by means of a simple mixing device such as a tumbler, Henschel mixer, etc. When either of these materials is a large solid having a bale form, etc., it is preliminarily melt-kneaded and homogenized with a batch melt-kneading apparatus such as a roll, a kneader, a Banbury mixer, etc., and pelletized or pulverized so that it can be easily fed to a co-modifying apparatus.

Steps other than the step of allowing the polypropylene and the rubbery substance as materials to be co-present can be carried out by the same graft polymerization method as that used for the production of the modified polypropylene (B) or that used for the production of the modified rubbery substance, whereby the above materials are co-grafted.

In said co-grafting, the proportions of the polypropylene and the rubbery substance as materials can be freely selected. However, it is preferable to determine the proportions on the basis of the proportions of the graft polypropylene (B) and the modified rubbery substance in the thermoplastic resin composition of the present invention.

When the co-graft polymerization is carried out, the amount of the unsaturated carboxylic acid or the derivative thereof is preferably 0.01 to 20 parts by weight, more preferably 0.1 to 5 parts by weight, the amount of the unsaturated aromatic monomer if used is preferably 0.01 to 15 parts by weight, more preferably 0.1 to 5 parts by weight, per 100 parts by weight of the starting material polypropylene and rubbery substance in total, and the weight ratio of the unsaturated aromatic monomer to the unsaturated carboxylic acid or the derivative thereof is preferably 0.1 to 3.0, more preferably 0.5 to 2.0. And, the amount of the radical initiator, used if necessary, is preferably at most 5 parts by weight, more preferably 0.001 to 2 parts by weight.

In order to disperse the starting polypropylene and the starting ethylene copolymer rubber while dynamically co-grafting them, it is preferable to use a highly efficient melt-kneading apparatus such as a highly efficient twin-screw extruder, etc.

V Other fillers

When producing the thermoplastic resin composition of the present invention, a filler can be incorporated for the purpose of reinforcement, function impartation and extension for reducing manufacturing cost.

The filler can be selected from fibers such as glass fibers, carbon fibers, polyamide fibers, metal fibers and whiskers of aluminum, stainless steel, etc., and inorganic fillers such as silica, alumina, calcium carbonate, talc, mica, clay, kaolin, carbon black, $TiO_2$, $ZnO$, $Sb_2O_3$, etc.

All of these fillers can be used for reinforcement. Fillers such as carbon fibers, metal fibers, carbon black, etc., can lower the surface resistivity and the volume resistivity and impart electric conductivity to the thermoplastic resin composition of the present invention. Any filler that is less expensive than the resin can be used as an extender to reduce the manufacturing cost.

For the purpose of improvement of the thermoplastic polypropylene resin composition in stiffness and heat resistance, the filler is particularly preferably selected from inorganic fillers such as a glass fiber, a potassium titanate whisker, talc, mica, potassium carbonate, etc., and carbon fibers.

It is one of the preferred embodiments to use the thermoplastic resin composition of the present invention as a composite material by further incorporating thereinto a flame-retardant or flame retardant auxiliary, a lubricant, a nucleating agent, a plasticizer, a dye, a pigment, an antistatic agent, an antioxidant, a weatherability-imparting agent, etc.

VI Proportions of the composition

The thermoplastic resin composition of the present invention comprises 100 parts of the polyamide resin composition (C) consisting of the polyamide resin (A) and another thermoplastic resin (B) and 0.01 to 20 parts by weight of the modifier (D).

In 100 parts by weight of the polyamide resin composition (C), there is usually contained 10 to 80% by weight, preferably 30 to 70% by weight, of the polyamide resin (A). When the amount of the polyamide resin (A) is less than 10% by weight, the thermoplastic resin composition tends to show no sufficient effect on improvement in coatability, stiffness, heat resistance, etc., even if the modifier (D) is incorporated. When this amount exceeds 80% by weight, the thermoplastic resin composition tends to show good coatability, adhesion, printability, etc., and it is not always necessary to incorporate the modifier (D). However, the thermoplastic resin composition sometimes poses problems concerning water absorption properties, a cost increase, etc.

In the polyamide resin composition (C), the "another thermoplastic resin (B)" other than the polyamide resin, i.e. at least one member selected from the polyolefin resin, polyphenylene resin and unsaturated polyester resin, is usually contained in an amount of 90 to 20% by weight, preferably 70 to 30% by weight. When the amount of the thermoplastic resin (B) other than the polyamide resin is less than 20% by weight, the thermoplastic resin composition tends to show good coatability, adhesion, printability, etc., and it is not always necessary to incorporate the modifier (D). However, the thermoplastic resin composition sometimes shows an increase in water absorption properties. When this amount exceeds 80% by weight, the thermoplastic resin composition tends to show no sufficient improvement in coatability, physical properties, etc., even if the modifier (D) is incorporated.

When the amount of the modifier (D) per 100 parts by weight of the polyamide resin composition (C) containing the polyamide resin is less than 0.01 part by weight, the thermoplastic resin composition tends to show no effect on improvement in coatability, physical properties, etc. When this amount exceeds 20 parts by weight, sometimes no desirable properties of toughness, etc., can be obtained.

The rubbery substance or the modified rubbery substance may be incorporated in order to improve the thermoplastic resin composition of the present invention in impact resistance, low-temperature impact resistance in particular. The amount thereof per 100 parts by weight of the polyamide resin composition (C) is usually 0.1 to 100 parts by weight, preferably 1 to 70 parts by weight. When the amount of the rubber substance or modified rubber substance is less than 0.1 part by weight, sometimes no effect is produced on improvement in impact resistance. When this amount exceeds 100 parts by weight, the heat resistance, etc., tend to be undesirably degraded.

The filler may be incorporated for reinforcement and function-imparting. The amount of the filler per 100 parts by weight of the thermoplastic resin composition is usually 0.1 to 300 parts by weight, preferably 1 to 200 parts by weight. When the filler amount is less than 0.1 part by weight, sometimes no filling effect is produced. When this amount exceeds 300 parts by weight, the thermoplastic resin composition tends to show degradation in toughness and impact resistance and tends to lose properties inherent to the resin to become fragile. Thus, sometimes no desirable effect is obtained.

VII The methods for the production of the polyamide resin composition (C) and for the production of a composition containing the polyamide resin composition (C) and the rubbery substance and/or the modified rubbery substance are not critical. Any known ordinary methods can be employed.

The above compositions may be efficiently prepared by mixing the components thereof in a solution state and evaporating a solvent used, or precipitating them in a non-solvent. From an industrial point of view, there is employed a method which comprises kneading the components in a molten state. In general, this melt-kneading can be carried out with a kneading apparatus such as a Banbury mixer, an extruder, a roll, various kneaders, etc.

When the kneading is carried out, it is desirable to preliminarily mix the resin components in a state of powders or pellets homogeneously with an apparatus such as a tumbler or a Henschel mixer. However, if necessary, the resin components may be individually and quantitatively fed to a kneading apparatus without the above preliminary mixing.

The polyamide resin composition (C) and the composition containing the polyamide resin composition (C) and the rubbery substance and/or the modified rubbery substance are disclosed, e.g. in JP-A-61-64741 (U.S. Pat. No. 4,780,505), JP-A-1-202419 and U.S. Pat. No. 4,315,086.

When the modifier (D) is then incorporated into the polyamide resin composition (C) consisting of the polyamide resin and another thermoplastic resin, a variety of methods can be employed. Specifically, there is one method which comprises kneading the polyamide resin and another thermoplastic resin with a continuous kneading apparatus having separate quantitative feed devices and then continuously incorporating the modifier (D) through the feed device for a backward zone. There is another method which comprises dry-blending pellets of the polyamide resin composition (C) consisting of the polyamide resin and another thermoplastic resin with the modifier (D) or a master batch formed of the modifier (D) and the polyamide resin.

The second aspect of the present invention is directed to a molded article which is formed of the polyamide resin composition (C) and which has an S/W ratio of not less than 1.2 in which W is a weight percentage of the polyamide in the polyamide resin composition (C) and S is a percent occupied area of the polyamide resin on the surface of the article and/or an N/W ratio of not less than 1.2 in which W is an defined above and N is the percent concentration of polyamide resin on the surface of the article determined on the basis of the nitrogen concentration on the surface of the article. When the thermoplastic resin composition of the present invention optionally contains a rubber component and/or a filler, the above W is defined as a weight percentage of the polyamide in the total amount of the polyamide resin composition (C), the rubber component and the filler. When the S/W ratio and the N/W ratio are less than 1.2, the thermoplastic resin composition undesirably shows inferior coating adhesion.

One method for adjusting the S/W ratio and/or the N/W ratio to not less than 1.2 is directed to the third aspect of the present invention, in which a molded article is formed by a method of adding the modifier (D) to the polyamide resin composition (C) and molding the mixture. The adjustment of the S/W ratio and/or the N/W ratio to not less than 1.2 can be also achieved by varying the terminal groups of the nylon, changing the method for incorporating the components into the thermoplastic resin composition comprising the polyamide resin at the time of preparation, elevating a resin temperature when an article is formed by molding, or the like.

The thermoplastic resin composition of the present invention makes it possible to easily increase the polyamide concentration on the molded article surface by a usual molding method such as injection molding, extrusion molding, compression molding, blow molding, roll molding, lamination molding, vacuum forming, pressure molding, etc.

Of the above molding and forming methods, injection molding is preferred from the viewpoint of productivity, etc. A molded article is produced by preliminarily drying a pelletized composition in a vacuum dryer, a hot air dryer, etc., and injection-molding the composition under predetermined conditions including injection rate, injection time, cooling temperature, etc.

The present invention provides improvement on the coating adhesion by increasing the percent concentration of the polyamide on the surface of the molded article. It may be possible to further increase the coating adhesion by irradiating an ultraviolet light of 300 nm or shorter on the surface of the molded article which has already had a sufficiently improved coating adhesion according to the present invention (hereinafter UV treatment).

The present invention will be explained hereinafter by reference to Examples, to which the present invention shall not be limited.

(1) Raw materials used in Examples and Comparative Examples

1 Polyamide resin

A commercially available 6-nylon was used.

The above 6-nylon had the following relative viscosity, measured by a 98% sulfuric acid method, and the following functional group content in the polyamide resin terminal, determined by a neutralization titration method, according to JIS K 6810.

(i) PA-1; relative viscosity: 2.1, amino group: 84 mmol/kg, carboxyl group: 84 mmol/kg (Nylon A-1020BRL, supplied by Unitika, Ltd., to be referred to as PA-1 hereinafter)

(ii) PA-2; relative viscosity: 2.35, amino group: 94 mmol/kg, carboxyl group: 54 mmol/kg (Nylon A-1030A supplied by Unitika, Ltd., to be referred to as PA-2 hereinafter)

(iii) PA-3; relative viscosity: 3.4, amino group: 42 mmol/kg, carboxyl group: 42 mmol/kg (Nylon A-1030BRT supplied by Unitika, Ltd., to be referred to as PA-3 hereinafter)

(iv) PA-4; relative viscosity: 2.18, amino group: 36 mmol/kg, carboxyl group: 121 mmol/kg (Nylon A-1020A-③, to be referred to as PA-4 hereinafter)

(v) PA-5; powders obtained by pulverizing PA-3 (to be referred to as PA-5 hereinafter)

2 Polyolefin resin

A modified polypropylene was prepared in the following manner.

A propylene homopolymer, as a starting material, prepared by a slurry polymerization method according to the process described in JP-A-60-28405, which had a melt flow rate of 1.3 g/10 minutes, an intrinsic viscosity, measured in tetralin at 135° C., of 2.45 dl/g, a 20° C. cold xylene-soluble content of 2.9% by weight, a boiling heptane-soluble content of 6.7% by weight, and an isotactic pentad, in its boiling heptane-insoluble portion, of 0.955 was modified in the following manner.

100 Parts by weight of the propylene homopolymer as a starting material, 1.0 part by weight of maleic anhydride, 0.6 part by weight of a radical initiator prepared by allowing a propylene homopolymer to support 8% by weight of 1,3-bis(t-butylperoxyisopropyl)benzene (Sanperox ®-TY1-3 supplied by Sanken Kako Co., Ltd.) and 0.1 part by weight of Irganox ® 1010 (supplied by Ciba Geigy, Ltd.) as a stabilizer were uniformly mixed with a Henschel mixer. The resultant mixture was melt-kneaded with a twin-screw extruder, model TEX 44 SS-30BW-2V supplied by Japan Steel Works Ltd., at a temperature of 220° C. for an average residence time of 1.5 minutes to give a maleic anhydride-modified polypropylene (A) having a maleic anhydride graft amount of 0.08% by weight and a melt flow rate of 36 g/10 minutes. This graft polypropylene (A) is abbreviated as M-PP hereinafter.

3 Rubbery substance

A commercially available EPM was used.

EPM; having a Mooney viscosity, measured at 121° C. according to JIS K 6300, of 33 and an ethylene content, measured by infrared absorption spectrum, of 73% by weight.

(Esprene ® E-111P, supplied by Sumitomo Chemical Co., Ltd., to be referred to as EPM hereinafter)

4 Modified rubbery substance (i) Modified ethylene-propylene rubber

A modified rubber was prepared in the following manner. 100 Parts by weight of pellets of an ethylene-propylene rubber having a number average molecular weight of 60,000 and an ethylene content of 78% by weight, 2.0 parts by weight of maleic anhydride, 2.0 parts by weight of styrene and 1.0 part by weight of a radical initiator prepared by allowing a propylene homopolymer to support 8% by weight of 1,3-bis(t-butylperoxyisopropyl)benzene (Sanperox ®-TY1-3 supplied by Sanken Kako Co., Ltd.) were mixed with a Henschel mixer. The resultant mixture was melt-kneaded in a twin-screw extruder; TEX 44 SS 30BW-2V, supplied by Japan Steel Works Ltd., under nitrogen atmosphere at a kneading temperature of 250° C. and an extrusion rate of 18 kg/hour to give a modified ethylene-propylene copolymer rubber having a maleic anhydride graft amount of 1.5% by weight, a styrene graft amount of 0.8% by weight and a Mooney viscosity ($ML_{1+4}$ 121° C.), at 121° C., of 70. This modified ethylene-propylene copolymer rubber is abbreviated as MS-EPM.

(ii) Epoxy group-containing copolymer

A glycidyl methacrylate-ethylene copolymer as an epoxy group-containing copolymer was prepared in the following manner.

A glycidyl methacrylate-ethylene copolymer was prepared by reference to the process described in JP-A-47-23490 and JP-A-48-11388.

A 40-liter stainless steel reactor having a proper feed port, an outlet and a stirrer was continuously charged with glycidyl methacrylate, ethylene, a radical initiator and a chain transfer agent with stirring at 1,400 to 1,600 atmospheric pressures at 180° to 200° C. to carry out copolymerization reaction. The glycidyl methacrylate-ethylene copolymer had a weight ratio of glycidyl methacrylate to ethylene of 12:88. This copolymer is abbreviated as E-GMA hereinafter.

5 Filler

An ultrafine powder "Talc Microace P132" supplied by Nippon Talc Co., Ltd. was used as a filler. The talc Microace P132 had a 50% average particle diameter D50, determined by the following apparatus and under the measurement conditions, of 2.1 μm.

Measuring apparatus: Centrifugal-precipitation type particle size distribution measuring apparatus SA-CP2-20, supplied by Shimadzu Corporation.

Revolution rate: 500 rpm
Liquid surface height: 3

D50 was determined according to minus sieve method plotting.

6 Co-modified resin composition of polyolefin resin (B) and rubbery substance

Four polypropylene/rubbery substance co-modified resin compositions were prepared in the following manner.

(i) 100 Parts by weight of a mixture obtained by mixing a commercially available polypropylene homopolymer (Sumitomo Noblen® WF299B, supplied by Sumitomo Chemical Co., Ltd.) and a commercially available ethylene-propylene copolymer rubber (Esprene® E 512P, supplied by Sumitomo Chemical Co., Ltd.) in a mixing ratio of 26.5:12.5, 0.5 part of maleic anhydride, 1.0 part by weight of a radical initiator prepared by allowing a propylene homopolymer to support 8% by weight of 1,3-bis(t-butylperoxyisopropyl)benzene (SanPerox®-TY1.3 supplied by Sanken Kako Co., Ltd.) and 0.1 part by weight of Irganox® 1010 (supplied by Ciba Geigy, Ltd.) were uniformly mixed with a Henschel mixer. Then, the resultant mixture was melt-kneaded in a twin-screw extruder, TEX 44 SS 30BW-2V, supplied by Japan Steel Works Ltd., at a temperature of 220° C. for an average residence time of 1.5 minutes to give a polypropylene/rubbery substance co-modified resin composition having a melt flow rate of 14 g/10 minutes. This modified resin composition is abbreviated as M-(PP/EPM)-1 hereinafter.

(ii) The preparation procedure for the above M-(PP/EPM)-1 was repeated except that the mixing ratio of the polypropylene homopolymer and the ethylene-propylene copolymer rubber was changed to 30.5:15, whereby a polypropylene/rubbery substance co-modified resin composition was obtained. This resin composition is abbreviated as M-(PP/EPM)-2 hereinafter.

(iii) The same procedure for preparing M-(PP/EPM)-1 described above was repeated except that the mixing ratio of the polypropylene homopolymer to the ethylene-propylene copolymer rubber was changed to 24:12.5 to obtain a polypropylene/rubbery substance co-modified resin composition. It is referred to as M-(PP/EPM)-3 hereinafter.

(iv) The same procedure for preparing M-(PP/EPM)-1 described above was repeated except for using 100 parts by weight of a mixture obtained by mixing a commercially available polypropylene homopolymer (Sumitomo Noblen® FS2055C, supplied by Sumitomo Chemical Co., Ltd.) and a commercially available EPM (Esprene® E111P, supplied by Sumitomo Chemical Co., Ltd.) in a mixing ratio of 8.5:8, 1.0 part of maleic anhydride and 0.5 part of the radical initiator to obtain a polypropylene/rubbery substance co-modified resin composition. It is referred to as M-(PP/EPM)-4 hereinafter.

The following composition were prepared in the following manner unless otherwise specified.

(1) Master batch of polyamide resin and talc

A predetermined amount of PA-1, PA-2 or PA-3 and a predetermined amount of talc were kneaded in a continuous twin-screw kneading machine, TEX 44 SS 30BW-2V, supplied by Japan Steel Works Ltd. at an extrusion rate of 25 kg/hour at a cylinder temperature of 230° C. at a screw revolution rate of 900/minute under vent suction to give master pellets. The screw had a constitution in which a triple thread rotor and a kneading disk were arranged in each of two kneading zones, one zone after a first feed inlet and the other after a second feed inlet.

(2) Polyamide resin composition containing polyamide resin

A predetermined amount of the master pellets of PA-1, PA-2 or PA-3 and talc and a predetermined amount of the other components were weighed. These components were kneaded with a continuous twin-screw extruder at an extrusion rate of 40 kg/hour at a cylinder temperature of 260° C. at a screw revolution rate of 900/minute under vent suction to give pellets.

(3) Master batch of modifier and polyamide resin

A homogeneous mixture of 5% by weight of succinic anhydride with 95% by weight of PA-3 was kneaded in a continuous twin-screw extruder under the same conditions as those for the preparation of the master batch of a polyamide resin and talc, whereby pellets were obtained. They are referred to a modifier MB-1 hereinafter.

(ii) The same procedure for preparing the modifier MB-1 was repeated except for using 2.5% by weight of succinic anhydride and 97.5% by weight of PA-5 to obtain a master batch of the modifier and the polyamide. It is referred to as a modifier MB-2 hereinafter.

(4) Thermoplastic resin composition comprising polyamide resin composition containing polyamide resin and modifier (i) A polyamide resin composition containing a polyamide resin was dry-blended with a modifier alone or with the master batch of a modifier and a polyamide resin to give a thermoplastic resin composition as a final product.

(ii) To a continuous kneader having first, second and third feeding zones were introduced a co-modified product of a polyolefin resin and a rubbery substance at the first zone, a polyamide resin composition containing a polyamide resin at the second zone and, if necessary, a master batch of a modifier and a polyamide resin at the third zone to obtain a thermoplastic resin composition as a final product. The final product is referred to as continuously kneaded composition hereinafter.

The following molded articles were prepared under the following conditions unless otherwise specified.

(1) A plate-shaped molded article having a size of 100 mm in width, 400 mm in length and 3 mm in thickness was prepared by injection-molding a composition with a Sumitomo Nestar injection molding machine and Neomat 350/120 SYCAP-M at a cylinder temperature of 250° C., at a mold temperature of 50° C., at an injection pressure, primary/secondary, of 84 (kg/cm$^2$G)/53, at an injection rate of FCV 5/10, for an injection time of 15 seconds and for a mold-cooling time of 30 seconds.

(2) A test piece for measurement of mechanical properties specified in ASTM or JIS was prepared by injection-molding a composition with a Toshiba Machinery IS150E at a cylinder temperature of 250° C., at a mold temperature of 50° C. at an injection pressure, primary/secondary, of 65%/50, at an injection rate of 20%, for an injection time of 15 seconds and for a mold-cooling time of 30 seconds.

Methods for determining the physical properties in Examples are described below.

(1) Specific gravity

Determined according to the method specified in JIS K 6758.

(2) Melt flow rate

Determined according to the method specified in JIS K 6758. The measurement temperature was 230° C., and the load was 2.16 kg unless otherwise specified.

(3) Tensile test

Carried out according to the method specified in ASTM D638. A test piece having a thickness of 3.2 mm was measured for a tensile yield strength and a tensile elongation. The measurement temperature was 23° C. unless otherwise specified.

(4) Flexural test

Carried out according to the method specified in JIS K 7203. A test piece having a thickness of 3.2 mm was measured for a flexural modulus and a flexural strength at a span length of 50 mm at a loading rate of 1.5 mm/minute. The measurement temperature was 23° C. unless otherwise specified. When the test was carried out at a temperature other than 23° C., a sample was conditioned in a constant temperature bath at a predetermined temperature for 30 minutes before the test.

(5) Izod impact strength

Determined according to the method specified in JIS K 7110. A test piece having a thickness of 3.2 mm was measured for a notched impact strength. The measurement temperature was 23° C. unless otherwise specified. When the measurement was carried out at a temperature other than 23° C., a sample was conditioned in a constant temperature bath at a predetermined temperature for 2 hours before the measurement.

(6) Penetration impact strength

A sample piece of 100 mm square taken from the above plate-shaped test piece having a size of 100 mm in width, 400 mm in length and 3 mm in thickness was used.

The above sample piece was set at a stage having a diameter of 50 mm and air-chucked, and a 13R impact probe was set. A load was dropped on the impact probe with a predetermined tool to determine whether or not the sample piece was broken. A 50% breaking height was determined by an UP-DOWN method in n=20 according to the method specified in JIS K 7211, and a 50% breaking energy was determined on the basis of a load used.

The conditioning was carried out with a constant-temperature bath attached to the apparatus. The test piece Was placed in the constant-temperature bath adjusted to −40° C. and conditioned for 2 hours before the above test. This temperature is the measurement temperature.

(7) Heat distortion temperature

Determined according to the method specified in JIS K 7207. The fiber stress was measured at 4.6 kg/cm$^2$.

(8) Rockwell hardness

Determined according to the method specified in JIS K 7207. The thickness of a test piece was 3.2 mm, a steal ball of R was used, and the evaluation value was expressed on R scale.

(9) Mold shrinkage factor

A plate-shaped molded article having a size of 100×400×3 mm was held in a constant-temperature chamber having a temperature of 23° C. and a relative humidity of 50% for 48 hours after having been injection-molded, and measured the sizes along the machine and transverse directions. On the basis of data obtained and the actural sizes of the mold, the mold shrinkage factor was obtained.

(10) Linear expansion coefficient

A test piece of 12.7 mm square was taken from the central portion of a plate-shaped molded article having a size of 100×400×3 mm. Then, the sample piece was subjected to anealing treatment at 120° C. for 30 minutes and then measured for a linear expansion coefficient from −30° C. to 120° C. with TMA-40/DT-40 supplied by Shimadzu Corporation.

(11) Coating adhesion

A 50×50×3 mm sample piece was taken from the central portion of a plate-shaped molded article having a size of 100×400×3 mm. A surface of the sample piece was cleansed by wiping the surface with isopropanol and the surface was then air-dried. The surface was spray-coated with an acryl urethane-based coating composition. Recrack #440, supplied by Fujikura Chemical Co., Ltd., and baked and dried at 80° C. for 30 minutes.

After 24 hours, a checker board pattern containing 100 squares (10×10) was made on the above coated surface with a razor blade, and a pressure adhesive tape (Cellotape ®, supplied by Nichiban Co., Ltd.) of 24 mm width was applied thereon under pressure with the finger. Then, the tape was peeled off by pulling its one end rapidly. The coating adhesion was evaluated on the basis of the remaining ratio of squares (%) based on the number of remaining squares of the coating.

(12) Area ratio of polyamide resin on molded article surface

A test piece of 1 cm square taken from the central portion of a plate-shaped molded article having a size of 100×100×3 mm was used.

The above test piece was immersed in a 10 wt % phosphorus wolframate aqueous solution at 60° C. for 1 hour to stain the polyamide resin portion around the surface of the test piece with the phosphorus wolframate.

The test piece was washed with flowing pure water for 5 minutes, and air-dried at room temperature for 1 hour or more. The dried test piece was allowed to adhere to a sample stage of a scanning electron microscope with a carbon paste [colloidal graphite (with isopropanol) supplied by Ted Pella, Inc.], and coated with Pt-Pd by means of an ion sputtering apparatus such that the resultant Pt-Pd coating had an average thickness of 20 Å. The Pt-Pd coating conditions were as follows.

Apparatus: Ion sputter E-1030, supplied by Hitachi, Ltd.
Target: Pt-Pd (apparatus standard substance)
Sample chamber pressure: 7 Pa
Process gas: argon
Distance between target and sample: 30 mm
Discharge current: 15 mA
Coating time: 20 seconds
Sample stage temperature: 20° C.

An electron microscope photograph of a secondary electron image of the molded article surface was taken with an electron microscope at a magnifying power of 600 times and at an accelerating voltage of 2 KV. In the electron microscope photograph so-obtained, the polyamide resin exposed on the molded article surface was observed as a white color in contrast.

FIGS. 1(a), 1(b), 1(c) and 1(d) specifically show a change in image quality of the test piece of Comparative Example 4 when only the accelerating voltage was changed. It is shown that the optimum accelerating voltage was 2 KV.

The conditions for the scanning electron microscope are as follows.

Apparatus: Scanning electron microscope S-4000, supplied by Hitachi, Ltd.
Accelerating voltage: 2.0 KV
Condenser lens current: scale 6
Objective lens diaphragm: No. 2 (50 μm in diameter)
Working distance: 5 mm
Sample tilt: 0°

The photograph taken above was measured with an image analyzer for white portions, i.e. an area of the polyamide resin phase exposed on the surface, and the ratio of the polyamide resin area on the molded article surface to the entire field of view was calculated as an area ratio S.

In the area measurement, an image on the photograph was inputted to the image analyzer through a television camera and converted to a digital image on a display having 512×512 pixels and 256 gradation steps in variable density per pixel. A threshold value was determined with regard to the variable density, and only white portions, i.e. polyamide resin portions, were extracted from the image under measurement. An area of the extracted regions was measured.

When the threshold value for the extraction of an object under measurement is not proper, the measurement is not carried out properly. It is therefore necessary to determine the threshold value so as to extract only the object under measurement.

Figure 3B:
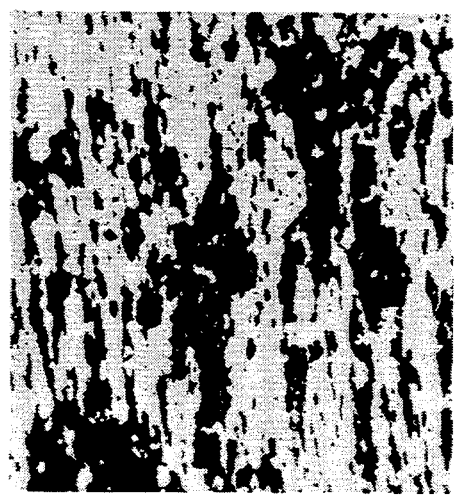
FIGS. 3(a) and 3(b) are electron micrographs showing the structure of a molded article surface. These Figures show a comparison between an original image 3(a) and an extraction image 3(b) in which the contrast of the original image 3(a) is insufficient.
Figure 3A:
Figure 4B:
FIG. 4(a) and 4(b) are electron micrographs showing the structure of a molded article surface. These micrographs show a comparison between the original image 4(a) and the extraction image 4(b) in which the brightness of the original image is nonuniform.
Figure 4A:

FIGS. 2(a), 2(b), 2(c) and 2(d) show actual cases for determining the threshold value. When the threshold value is set lower than a proper value, the object under measurement is underestimated. When the threshold value is set higher, the object is overestimated. An image quality for the extraction is also important. When the brightness is not uniform or when the contrast is insufficient, no proper extraction is possible. It is therefore necessary to take a photograph having proper contrast and uniform brightness. When the insufficiency in contrast and nonuniformity in brightness are slight, the brightness and contrast in an digital image inputted to the image analyzer may be corrected by means of the image processing function of the analyzer. FIG. 3 shows an actual case in which the brightness is not uniform, and FIG. 4 shows that in which the contrast is insufficient.

The image analyzer used for the measurement is as follows.

Apparatus; High-speed image processing unit TOSPIX-II, supplied by TOSHIBA CORP.
Software; Particle analysis package (supplied by TOSHIBA CORP.)
Image-inputting television camera: Monochrome CCD camera XC-37 (supplied by SONY CORP.)

In view of variations in measurement results from measurement sites, photographs of one test piece were taken in ten fields of view and measured, and an arithmetic mean of all of the measurement results on sampled sites was taken as an area ratio of the polyamide resin on the molded article surface.

The ratio S/W was taken as an index to estimate the effective percent concentration of the polyamide resin on the surface of the molded article. In this case, W refers to the weight percentage of the polyamide in the thermoplastic resin composition (C) when the composition (C) contains the polyamide resin (A) and another thermoplastic resin. However, in the case where the master batch of a modifier and the polyamide is used, W is calculated by adding the amount of the polyamide in the master batch to the amount of polyamide in the thermoplastic resin composition (C). In this case, the calculation is carried out according to the following equation:

$$W = \frac{\text{Weight of polyamide in polyamide resin (A) and in master batch}}{\text{Weight of polyamide resin composition (C) and master batch}} \times 100$$

(13) Concentration of polyamide resin on molded article surface

A test piece having a width of 5 mm and a length of 5 mm was taken from the central portion of the plate-shaped molded article having a size of 100×400×3 mm, and measured for the above concentration with an X-ray photoelectron analyzer ESCA 750 supplied by Shimadzu Corporation. In the measurement, the pressure within the analyzer was set at not more than $5 \times 10^{-5}$ Pa and the test piece was not tilted but placed with its surface horizontal.

The X-ray used was Mgkα, and the X-ray source power during the measurement was at 8 KV and 30 mA. The standard for binding energy was $C_{1s}$, and its peak top value was taken as 285 eV. An ESCA data processing unit ESPAC 100 supplied by Shimadzu Corporation was used for data acquisition and data processing, and the conditions for setting the unit were as follows.

| Element Name | $C_{1s}$ | $N_{1s}$ |
| --- | --- | --- |
| 1. Start Energy (eV) | 295 | 410 |
| 2. Stop Energy (eV) | 278 | 392 |
| 3. Step Energy (eV) | 0.05 | 0.05 |
| 4. Sampling Time (ms) | 500 | 500 |
| 5. Repeat Time | 1 | 1 |
| 6. Smoothing Points | 15 | 15 |
| 7. Background Start Point (eV) | 293 | 408 |
| 8. Background Stop Point (eV) | 280 | 394 |
| 9. Background Width (eV) | 4 | 4 |
| 10. Mode of Background Correction | 2 | 2 |

| Element Name | $C_{1s}$ | $N_{1s}$ |
| --- | --- | --- |
| 11. Sensitivity | 1 | 1.77 |

Spectra measured of $C_{1s}$ and $N_{1s}$ were subjected to smoothing and background treatments under the above conditions, and a nitrogen concentration (%)

$$\left( = \frac{\text{nitrogen}}{\text{carbon} + \text{nitrogen}} \times 100 \right)$$

was calculated on the basis of peak areas.

The same measurement was effected on five sampled sites. An arithmetic mean of all the measurement results was calculated and taken as a nitrogen concentration (%) on the molded article surface.

In order to calculate a polyamide resin concentration on the molded article surface on the basis of the measured nitrogen concentration, the same polyamide resin as that used in the test piece was measured in the same manner, and a nitrogen concentration of the polyamide resin alone was determined.

The method and conditions for molding the polyamide resin to be used for the measurement are not specially limited. However, it is desirable to mold the polyamide resin under the same conditions as those for the molding of the composition of the present invention.

Other measurement conditions are the same as those specified above, and the same measurement was carried out on five samples, and an arithmetic mean of the measurement results obtained is taken as a nitrogen concentration (%) of the polyamide resin.

A polyamide resin concentration N(%) on the molded article surface, obtained with ESCA, is calculated on the basis of the above-obtained values according to the following equation.

$$N = \frac{\text{nitrogen concentration on molded article surface}}{\text{nitrogen concentration of polyamide resin}} \times 100$$

The ratio N/W was taken as an index to estimate the effective percent concentration of the polyamide on the surface of the molded article. The value of W was calculated in the same manner as in the above item (12).

Examples 1–6 and Comparative Example 1 (Table 1)

A thermoplastic resin composition containing a polyamide resin was prepared by mixing PA-1 and PA-2 as a polyamide resin (A), M-PP as a polyolefin resin (B), MS-EPM and E-GMA as a modified rubbery substance and talc as a filler. The proportions of these components were 41, 5, 35.5, 10, 0.5 and 8% by weight, respectively. Each of the thermoplastic resin compositions was dry-blended with 0.5 part by weight of any one of succinic anhydride, adipic acid, hexamethylenediamine, hexamethylenetetramine, 1,12-diaminododecane and urea as a modifier (D), and plate-shaped molded articles having a size of 100×400×3 mm were prepared. Table 1 also shows coating adhesion that each of the molded articles exhibits.

Table 1 shows that the test pieces of the thermoplastic resin compositions containing succinic ankydride, adipic acid, hexamethylenediamine, hexamethylenetetramine, 1,12-diaminododecane or urea as a modifier (D), obtained in Examples 1 to 6, have excellent coating adhesion over the test piece of the thermoplastic resin composition containing no modifier (D), obtained in Comparative Example 1.

TABLE 1

| | Modifier (D) | Amount of modifier (D) (part by weight) | Coating adhesion (%) |
| --- | --- | --- | --- |
| Example 1 | Succinic anhydride | 0.5 | 46 |
| Example 2 | Adipic acid | 0.5 | 88 |
| Example 3 | Hexamethylenediamine | 0.5 | 96 |
| Example 4 | Hexamethylenetetramine | 0.5 | 67 |
| Example 5 | 1,12-diaminododecane | 0.5 | 45 |
| Example 6 | Urea | 0.5 | 99 |
| Comparative Example 1 | Not incorporated | — | 0 |

Examples 7–9 and Comparative Example 2 (Table 2)

A thermoplastic resin composition containing a polyamide resin was prepared by mixing PA-3 as a polyamide resin (A), M-PP as a polyolefin resin (B), EPM as a rubbery substance, E-GMA as a modified rubbery substance and talc as a filler. The proportions of these components were 30, 40, 14.5, 0.5 and 15% by weight, respectively.

The above thermoplastic resin composition was dry-blended with a master batch of modifier (D) of PA-3/succinic anhydride (=95 parts by weight/5 parts by weight) in an amount as shown in Table 2, and test pieces and plate-shaped molded articles were prepared. Table 2 also shows the results of the determination of the physical properties. Table 2 shows that the test pieces or molded articles of the thermoplastic resins containing 1.5 to 6 parts by weight of the master batch of modifier (D), obtained in Examples 7 to 9 are excellent over that of the composition containing no master batch of modifier (D), obtained in Comparative Example 2, in tensile strength, flexural modulus, penetration impact strength, thermal distortion temperature, Rockwell hardness and linear expansion coefficient.

TABLE 2

| | Master batch of modifier (D) (part by weight) | MFR g/10 minutes | Tensile properties | | Flexural properties | |
| --- | --- | --- | --- | --- | --- | --- |
| | | | Strength at yeild point kg/cm² | Elongation at break % | Modulus kg/cm² | Strength kg/cm² |
| Example 7 | 1.5 | — | 279 | 19 | 18600 | 425 |
| Example 8 | 3.0 | — | 313 | 18 | 21400 | 485 |
| Example 9 | 6.0 | — | 352 | 20 | 22700 | 528 |
| Compara- | 0 | 5.3 | 242 | 25 | 16600 | 369 |

TABLE 2-continued tive Example 2

|  | Izod impact −40° C. kg · cm/cm | Penetration impact strength −40° C. kg · cm | Thermal distortion temperature °C. | Rockwell hardness | Mold shrinkage factor ×1/1000 | Linear expansion coefficient −30 to 120° C. ×10⁻⁵cm/cm°C. |
|---|---|---|---|---|---|---|
| Example 7 | 3.5 | 72 | 129 | 81 | 8.0 | 6.0 |
| Example 8 | 3.1 | 94 | 137 | 84 | 7.2 | 5.8 |
| Example 9 | 2.9 | 81 | 149 | 89 | 6.5 | 5.6 |
| Comparative Example 2 | 3.4 | 57 | 124 | 79 | 8.6 | 6.5 |

Example 10 and Comparative Example 3 (Table 3)

A thermoplastic resin composition containing a polyamide resin was prepared by mixing PA-1 and PA-2 as a polyamide resin (A), M-(PP/EPM)-2 as a co-modified product of a polyolefin resin (B) and a rubbery substance, E-GMA as a modified rubbery substance and talc as a filler. The proportions of these components were 47.5, 5, 39, 0.5 and 8% by weight, respectively. This thermoplastic resin composition was dry-blended with the same master batch of modifier (D) as that used in Examples 7 to 9 in an amount as shown in Table 3, and test pieces and molded articles were prepared and evaluated in the following manner.

The thermoplastic resin composition was dry-blended with the same master batch of modifier (D) as in Examples 7 to 9 in an amount as shown in Table 3. The test pieces and the plate-shaped molded articles having a size of 100×400×3 mm were obtained. Table 3 also shows the results of the determination of the physical properties.

Table 3 demonstrates that the test pieces and the molded articles of Example 10 prepared with using the master batch of modifier (D) have a more balanced physical properties than those of Comparative Example 3 prepared with not using the master batch of modifier (D).

In Example 10, both the percent occupied area of the polyamide resin on the surface S and the percent concentration of polyamide resin on the surface N determined on the basis of the nitrogen concentration are larger than the weight percentage of the polyamide resin (A) W, and both the values S/W and N/W are more than 1.2. In Example 10, the test pieces and the molded articles show a high coating adhesion. In contrast, in the test pieces and the molded articles of Comparative Example 3, which were prepared in the same manner as in Example 10 except that the master batch of modifier (D) was not utilized, the percent occupied area of the polyamide on the surface S and the percent concentration of polyamide resin on the surface N determined on the basis of the percent concentration of nitrogen are similar to the weight percentage of the incorporated polyamide resin W, and the values S/N and N/W are both less than 1.2. In Comparative Example 3, the test pieces and the molded articles show a low coating adhesion. These results demonstrate that the molded articles of Example 10 according to the present invention have a highly improved coatability as compared with those of Comparative Example 3 prepared with not containing a modifier (D).

TABLE 3

|  | Amount of mastar batch of modifier (D) (part by weight) | MFR g/10 minutes | Tensile properties | | Flexural properties | |
|---|---|---|---|---|---|---|
|  |  |  | Strength at yield point kg/cm² | Elongation at break % | Modulus kg/cm² | Strength kg/cm² |
| Example 10 | 6 | 6.6 | 436 | 57 | 21800 | 636 |
| Comparative Example 3 | 0 | 3.7 | 408 | 126 | 21700 | 624 |

|  | Izod impact −40° C. kg · cm/cm | Penetration impact strength −40° C. kg · cm | Thermal distortion temperature °C. | Rockwell hardness | Mold shrinkage factor ×1/1000 | Linear expansion coefficient −30 to 120° C. cm/cm°C. |
|---|---|---|---|---|---|---|
| Example 10 | 6.2 | 320 | 154 | 106 | 7.4 | 6.0 |
| Comparative Example 3 | 6.4 | 340 | 151 | 100 | 9.0 | 6.8 |

|  | Weight percentage of polyamide resin (D) W (%) | Percent occupied area of polyamide resin on surface S (%) | Concentration of polyamide resin on surface based on N concentration N (%) | S/W | N/W | Coating adhesion (%) |
|---|---|---|---|---|---|---|
| Example 10 | 54.9 | 82 | 98 | 1.49 | 1.78 | 100 |
| Comparative | 52.5 | 59 | 62 | 1.12 | 1.18 | 3 |

Example 11 and Comparative Example 4 (Table 4)

The same compositions as in Example 10 and Comparative Example 3 were individually molded into molded articles of a wheel cover.

The above molding was carried out with IS650 supplied by Toshiba Machinery Works, Ltd., at a cylinder temperature of 250° C., at a mold temperature of 50° C., at a hot linear temperature of 220° C., under an injection pressure, primary/secondary, of 50(%)/30, at an injection rate of 50%, for an injection time of 15 seconds, and for a mold cooling time of 30 seconds, whereby molded articles of a wheel cover having an outer diameter of 16 inches and a top board thickness of 2.0 mm were obtained.

The mold for these molded articles had a gate in the central portion. The molded articles were measured for coating adhesion on three sites positioned in different distances from the gate. The measurement method for the coating adhesion is as same as described in the method (11).

TABLE 4

|  | Distance from gate (mm) | Coating adhesion (%) |
| --- | --- | --- |
| Example 11 | 25 | 100 |
|  | 85 | 100 |
|  | 170 | 100 |
| Comparative Example 4 | 25 | 0 |
|  | 85 | 0 |
|  | 170 | 0 |

PA-1 and 4.5% by weight of PA-2 as polyamide resins and 14% by weight of talc as a filler at the second zone, successively. The mixture in the kneader extruder was continuously kneaded and extruded to obtain a thermoplastic resin composition. The above procedure was carried out under vent suction with TEM100 twin-screw extruder manufactured by TOSHIBA CORP. equipped with three inlets. The cylinder temperature was 260° C., the revolution number of the screw 240 rpm, and the outlet 300 kg/hour.

The values of S/W and N/W were 1.2 or more. The molded product prepared from the composition exhibited a high coating adhesion although slight flowmarks were brought about on the surface.

Example 13 (Table 5)

The same procedure as in Example 12 was repeated except that 6 parts by weight on MB-2 as a modifier (D) was fed at the third zone of the continuous kneader extruder having first, second and third feeding zones to obtain a thermoplastic resin composition as a final product. The composition maintained a satisfactory level of penetration impact strength and had a more improved heat resistance and linear expansion coefficient than the composition of Example 12. The molded article prepared from the composition of Example 13 was excellent in gloss and had no defect nor flowmarks on the surface. The values S/W and N/W were larger than those in Example 12. No problem was brought about in coating adhesion.

TABLE 5

|  | MFR g/10 minutes | Tensile properties | | Flexural properties | | Izod impact −40° C. kg · cm/cm |
| --- | --- | --- | --- | --- | --- | --- |
|  |  | Strength at yield point kg/cm² | Elongation at break % | Modulus kg/cm² | Strength kg/cm² |  |
| Example 12 | 5.6 | 377 | 26 | 21100 | 562 | 8.7 |
| Example 13 | 7.7 | 399 | 31 | 22700 | 603 | 7.0 |

|  | Penetration impact strength −40° C. kg · cm | Heat distortion temperature °C. | Rockwell hardness | Mold shrinkage factor ×1/1000 | Linear expansion coefficient −30 to 120° C. cm/cm°C. | Weight percentage of polyamide resin W (%) |
| --- | --- | --- | --- | --- | --- | --- |
| Example 12 | 194 | 153 | 100 | 7.8 | 9.1 | 49 |
| Example 13 | 198 | 165 | 103 | 5.8 | 6.8 | 52 |

|  | Percent occupied area of polyamide resin on surface S (%) | Percent concentration of polyamide resin on surface based on nitrogen concentration N (%) | S/W | N/W | Coating adhesion (%) | Appearance |
| --- | --- | --- | --- | --- | --- | --- |
| Example 12 | 68 | 61 | 1.39 | 1.24 | 85 | Slight flowmarks |
| Example 13 | 83 | 73 | 1.60 | 1.40 | 100 | Good |

Example 12 (Table 5)

To a continuous kneader extruder having first, second and third feeding zones were introduced 36.5% by weight of M-(PP/EPM)-3 as a co-modified product of a polyolefin resin and a rubbery substance at the first zone, and a master batch containing 44.5% by weight of Example 14 (Table 6)

The thermoplastic resin composition of Example 12 was molded into a wheel cover. The molding conditions were as same as in Example 11. Before coating, the surface of the molded article was irradiated in a 15 cm distance for 60 seconds with an ultraviolet light the wavelengths of which fall within the region of 300 nm or less. The coating adhesion was determined according to the method described in item (11) above concerning coating adhesion. It was the mean value of the data obtained on the sites at a distance of 25 mm, 85 mm and 170 mm from the gate.

Example 15 (Table 6)

The same procedure as in Example 14 was repeated except for using the thermoplastic resin composition of Example 13.

Table 6 shows the results of Examples 14 and 15. Both the compositions of these examples were excellent in coating adhesion. In particular, the composition of Example 15 containing a modifier shows a high coating adhesion.

TABLE 6

| | Content of succinic anhydride (% by weight) | UV irradiation | Coating adhesion (%) |
|---|---|---|---|
| Example 14 | 0 | yes | 95 |
| Example 15 | 2.8 | yes | 100 |

Example 16 and Comparative Example 5 (Table 7)

A thermoplastic resin composition was prepared by mixing 41% by weight of PA-4 and 5% by weight of PA-2 as polyamide resins (A), 35.5% by weight of M-PP as a polyolefin resin (B), 10% by weight of MS-EPM and 0.5% 8% by weight of E-GMA as modified rubbery substances and by weight of talc as a filler (Example 16).

The same procedure as in Example 16 was repeated except for replacing PA-4 with PA-1 to obtain a thermoplastic resin composition (Comparative Example 5). In the composition, the amount of the terminal amino group equals to that of the terminal carboxyl group.

The thermoplastic resin composition of Comparative Example 5, which had values S/W and N/W of less than 1.2, as inferior in coating adhesion. In contrast, the thermoplastic resin composition of Example 16, which contains PAI-4 having a larger amount of terminal carboxyl group than terminal amino group, kept the penetration impact strength at the same level as in Comparative Example 5 and has a satisfactorily high flexural modulus and heat distortion temperature. The composition of Example 16 had values S/W and N/W of more than 1.2 and shows a remarkably improved coating adhesion.

Example 17 and Comparative Example 6 (Table 7)

A thermoplastic resin composition was prepared by mixing 41% by weight of PA-4 and 5% by weight of PA-2 as polyamide resins (A), 45.5% by weight of M-(PP/EPM)-2 as a co-modified resin composition of polyolefin resin and a rubbery substance, 0.5% by weight of E-GMA as a modified rubbery substance and 8% by weight of talc as a filler (Example 17).

The same procedure as in Example 17 was repeated except for changing the contents of PA-4 and PA-2 to 36% by weight and 10% by weight, respectively to obtain a thermoplastic resin composition (Comparative Example 6).

The thermoplastic resin composition of Example 17, which contains PA-4 having a larger amount of terminal carboxyl group than terminal amino group and PA-2 having a larger amount of terminal amino group than terminal carboxyl group, had values S/W and N/W of more than 1.2 and shows a remarkably improved coating adhesion. In contrast, the thermoplastic resin composition of Comparative Example 6, which contains a larger amount of PA-4 and a smaller amount of PA-2 as compared with the composition of Example 17, had values of S/W and N/W of less than 1.2 and was inferior in coating adhesion.

Example 18 and Comparative Example 7 (Table 7)

A thermoplastic resin composition was prepared by mixing 44.5% by weight of PA-1 and 4.5% by weight of PA-2 as polyamide resins (A), 36.5% by weight of M-(PP/EPM)-4 as a co-modified resin composition of polyolefin resin and a rubbery substance, 0.5% by weight of E-GMA as a modified rubbery substance and 14% by weight of talc as a filler to obtain an intermediate composition and adding 6 parts by weight of MB-2 as a modifier per 100 parts of the intermediate composition. The thermoplastic resin composition was prepared by using a continuous kneader extruder having first, second and third zones and simultaneously introducing into it at the first zone a master batch of PA-1, PA-2 and talc, M-(PP/EPM)-4, E-GMA and MB-2 (Example 18). In Comparative Example 7, a thermoplastic resin composition was prepared by using the same kneader extruder and introducing M-(PP/EPM)-4 at the first zone, a master batch of PA-1, PA-2 and talc at the second zone and MB-2 at the third zone. The amounts of the components in Comparative Example 7 were as same as in Example 18.

The thermoplastic resin composition of Example 18 had values S/W and N/W of more than 1.2 and shows a satisfactorily high coating adhesion. In contrast, the thermoplastic resin composition of Comparative Example 7 had values of S/W and N/W of less than 1.2 and was inferior in coating adhesion.

Example 19 and Comparative Example 8 (Table 7)

A thermoplastic resin composition was prepared by mixing 36% by weight of PA-4 and 10% by weight of PA-2 as polyamide resins (A), 33% by weight of M-PP as a polyolefin resin, 12.5% by weight of ES-EPM and 0.5% by weight of E-GMA as modified rubbery substances and 8% by weight of talc as a filler. In Example 19, the composition was molded into an article with an injection molding machine at a cylinder temperature of 290° C. In Comparative Example 8, the composition was molded into an article with the same machine at a cylinder temperature of 250° C.

The physical properties of the articles were similar. However, the article of Example 19 had values S/W and N/W of more than 1.2 and shows a satisfactorily high coating adhesion. In contrast, the article of Comparative Example 8 had values of S/W and N/W of less than 1.2 and was inferior in coating adhesion.

TABLE 7

| | MFR | Tensile properties | | Flexural properties | Izod impact |
|---|---|---|---|---|---|
| | | Strength at yield | Elongation | | |

TABLE 7-continued

|  | g/10 minute | point kg/cm² | at break % | Modulus kg/cm² | Strength kg/cm² | −40° C. kg · cm/cm |
|---|---|---|---|---|---|---|
| Example 16 | 22 | 447 | 10 | 24600 | 675 | 3.0 |
| Comparative Example 5 | 4.9 | 440 | 36 | 23000 | 643 | 6.6 |
| Example 17 | 9.5 | 381 | 45 | 20700 | 577 | 6.8 |
| Comparative Example 6 | 4.0 | 357 | 64 | 18800 | 536 | 9.7 |
| Example 18 | 8.7 | 467 | 20 | 26900 | 707 | 6.8 |
| Comparative Example 7 | 3.2 | 470 | 49 | 26200 | 701 | 9.0 |
| Example 19 | — | 380 | 10 | 22000 | 575 | 3.4 |
| Comparative Example 8 | 12 | 373 | 14 | 21600 | 571 | 3.5 |

|  | Penetration impact strength −40° C. kg · cm | Heat distortion temperature °C. | Rockwell hardness | Weight percentage of polyamide resin (A) W (%) | Percent occupied area of polyamide resin on surface S (%) |
|---|---|---|---|---|---|
| Example 16 | 30 | 158 | 102 | 46 | 69 |
| Comparative Example 5 | 50 | 151 | 98 | 46 | 42 |
| Example 17 | 100 | 153 | 96 | 46 | 62 |
| Comparative Example 6 | 270 | 142 | 96 | 46 | 52 |
| Example 18 | 130 | 161 | 107 | 52 | 71 |
| Comparative Example 7 | 290 | 155 | 106 | 52 | 59 |
| Example 19 | 50 | 156 | 95 | 46 | 60 |
| Comparative Example 8 | 50 | 154 | 94 | 46 | 53 |

|  | Percent concentration of polyamide resin on surface based on N concentration N (%) | S/W | N/W | Coating adhesion (%) |
|---|---|---|---|---|
| Example 16 | 58 | 1.50 | 1.26 | 99.5 |
| Comparative Example 5 | 28 | 0.91 | 0.64 | 0 |
| Example 17 | 78 | 1.35 | 1.26 | 85 |
| Comparative Example 6 | 38 | 1.13 | 0.83 | 35 |
| Example 18 | 60 | 1.37 | 1.15 | 75 |
| Comparative Example 7 | 42 | 1.13 | 0.81 | 20 |
| Example 19 | 56 | 1.30 | 1.22 | 73 |
| Comparative Example 8 | 47 | 1.15 | 1.02 | 45 |

According to the present invention, there are obtained a thermoplastic resin composition and its molded article which are excellent in coatability, adhesion and printability, and which are also excellent in physical properties such as stiffness, heat resistance, impact resistance, etc., have excellent linear expansion coefficient and exhibit excellent appearance.

Molded articles produced from the thermoplastic resin composition of the present invention are used as automobile parts, electric and electronic parts, etc. Examples of the automobile parts are exterior fittings such as a bumper, a fender, an apron, a hood panel, a facia, a locker panel, a locker panel reinforce, a floor panel, a rear quarter panel, a door panel, a door support, a roof top, a trunk lid, etc.; interior fittings such as a instrumental panel, a console box, a glove box, a shift knob, a pillar garnish, a door trim, a steering wheel, an arm rest, a window roover, a carpet, a head rest, a seat belt, a seat, etc.; internal fittings in an engine room such as a distributor cap, an air cleaner, a radiator tank, a battery case, a radiator shroud, a washer tank, a cooling fan, a heater case, etc.; a mirror body, a wheel cover, a trunk trim, a trunk mat, a gasoline tank, and the like.

Of the above molded articles, the thermoplastic resin composition of the present invention is particularly suitably usable for automobile parts of which excellent stiffness and low-temperature impact resistance are required.

What is claimed is:

1. A thermoplastic resin composition which comprises:
   a polyamide resin composition (C) consisting of 10 to 80% by weight of a polyamide resin (A) and 20 to 90% by weight of at least one thermoplastic resin (B) selected from the group consisting of crystalline polypropylene, and saturated polyester resins, and
   at least one modifier (D) selected from the group consisting of:
   adipic acid,
   succinic anhydride, and
   a polyamide having a number average molecular weight of 400 to 9,000,
   the weight ratio of the modifier (D) to the polyamide resin composition (C) being 0.01:100 to 20:100.

2. The thermoplastic resin composition of claim 1, wherein the polyamide resin (A) is one member selected from the group consisting of poly-ε-caprolactam and polyhexamethylene adipamide.

3. A thermoplastic resin composition which comprises:
   a polyamide resin composition (C) consisting of 10 to 80% by weight of a polyamide resin (A) and 20 to 90% by weight of at least one thermoplastic resin (B) selected from the group consisting of crystalline polypropylene, polyphenylene resins and saturated polyester resins, the crystalline polypropylene including propylene homopolymer, propylene-ethylene random copolymer and propylene-ethylene block copolymer, and
   at least one rubbery component selected from the group consisting of:
   a rubbery substance,
   a modified rubbery substance, and
   a mixture of a rubbery substance and a modified rubbery substance, and
   at least one modifier (D) selected from the group consisting of:
   adipic acid, succinic anhydride, hexamethylenediamine, hexamethylenetetramine, 1,12-diaminododecane,
   urea, and
   a polyamide having a number average molecular weight of 400 to 9,000,
   the weight ratio of the rubbery component to the polyamide resin composition (C) being 0.1:100 to 100:100,
   the weight ratio of the modifier (D) to the total weight of the polyamide resin composition (C) being 0.01:100 to 20:100.

4. A thermoplastic resin composition which comprises:
   a polyamide resin composition (C) consisting of 10 to 80% by weight of a polyamide resin (A) and 20 to 90% by weight of at least one thermoplastic resin (B) selected from the group consisting of crystalline polypropylene, and saturated polyester resins,
   a filler, and
   at least one modifier (D) selected from the group consisting of:
   adipic acid, succinic anhydride, and
   a polyamide having a number average molecular weight of 400 to 9,000,
   the weight ratio of the filler to the polyamide resin composition (C) being 0.1:100 to 300:100,
   the weight ratio of the modifier (D) to the total weight of the polyamide resin composition (C) and the filler being 0.01:100 to 20:100.

5. A thermoplastic resin composition which comprises:
   a polyamide resin composition (C) consisting of 10 to 80% by weight of a polyamide resin (A) and 20 to 90% by weight of at least one thermoplastic resin (B) selected from the group consisting of crystalline polypropylene, and saturated polyester resins,
   at least one rubbery component selected from the group consisting of:
   a rubbery substance,
   a modified rubbery substance, and
   a mixture of a rubbery substance and a modified rubbery substance,
   a filler, and
   at least one modifier (D) selected from the group consisting of:
   adipic acid, succinic anthydride, and
   a polyamide having a number average molecular weight of 400 to 9,000,
   the weight ratio of the rubbery component to the polyamide resin composition (C) being 0.1:100 to 100:100,
   the weight ratio of the filler to the polyamide resin composition (C) being 0.1:100 to 300:100,
   the weight ratio of the modifier (D) to the sum of the polyamide resin composition (C), the rubbery component and the filler being 0.01:100 to 20:100.

6. A method for improving the coatability, adhesion and printability of a thermoplastic resin composition which comprises incorporating 0.01 to 20 parts by weight of at least one modifier (D) selected from the group consisting of:
   adipic acid,
   succinic anhydride, and
   a polyamide having a number average molecular weight of 400 to 9,000, into 100 parts by weight of a polyamide resin composition (C) consisting of 10 to 80% by weight of a polyamide resin (A) and 20 to 90% by weight of at least one thermoplastic resin (B) selected from the group consisting of crystalline polypropylene and saturated polyester resins.

7. A method for improving the coatability, adhesion and printability of a thermoplastic resin composition which comprises incorporating 0.1 to 100 pans by weight of at least one rubbery component selected from the group consisting of:
   a rubbery substance,
   a modified rubbery substance, and
   a mixture of a rubbery substance and a modified rubbery substance; and
   0.01 to 20 parts by weight of at least one modifier (D) selected from the group consisting of:
   adipic acid, succinic anhydride, and
   a polyamide having a number average molecular weight of 400 to 9,000 into 100 parts by weight of a polyamide resin composition (C) consisting of 10 to 80% by weight of a polyamide resin (A) and 20 to 90% by weight of at least one thermoplastic resin (B) selected from the group consisting of crystalline polypropylene and saturated polyester resins.

8. A method for improving the coatability, adhesion and printability of a thermoplastic resin composition which comprises incorporating 0.1 to 300 parts by weight of a filler and 0.01 to 20 pans by weight of at least one modifier (D) selected from the group consisting of:

adipic acid, succinic anhydride, and a polyamide having a number average molecular weight of 400 to 9,000 into 100 parts by weight of a polyamide resin composition (C) consisting of 10 to 80% by weight of a polyamide resin (A) and 20 to 90% by weight of at least one thermoplastic resin (B) selected from the group consisting of crystalline polypropylene and saturated polyester resins.

9. A method for improving the coatability, adhesion and printability of a thermoplastic resin composition which comprises incorporating 0.1 to 100 parts by weight of at least one rubbery component selected from the group consisting of:

a rubbery substance, a modified rubbery substance, and a mixture of a rubbery substance and a modified rubbery substance, 0.1 to 300 parts by weight of a filler and 0.01 to 20 parts by weight of at least one modifier (D) selected from the group consisting of:

adipic acid, succinic anhydride, and a polyamide having a number average molecular weight of 400 to 9,000 into 100 parts by weight of a polyamide resin composition (C) consisting of 10 to 80% by weight of a polyamide resin (A) and 20 to 90% by weight of at least one thermoplastic resin (B) selected from the group consisting of crystalline polypropylene and saturated polyester resins.

* * * * *